US012613859B2

(12) United States Patent
Pierce et al.

(10) Patent No.: US 12,613,859 B2
(45) Date of Patent: *Apr. 28, 2026

(54) SYSTEMS AND METHODS FOR BLOCKCHAIN RULE SYNCHRONIZATION

(71) Applicant: Chicago Mercantile Exchange Inc., Chicago,, IL (US)

(72) Inventors: Ryan Pierce, Chicago, IL (US); Ajay Madhavan, Aurora, IL (US); Stanislav Liberman, Highland Park, IL (US); Mansoor Ahmed, Naperville, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/642,009

(22) Filed: Apr. 22, 2024

(65) Prior Publication Data

US 2024/0273085 A1 Aug. 15, 2024

Related U.S. Application Data

(63) Continuation of application No. 17/700,059, filed on Mar. 21, 2022, now Pat. No. 11,995,067, which is a
(Continued)

(51) Int. Cl.
*G06Q 20/02* (2012.01)
*G06F 16/23* (2019.01)
(Continued)

(52) U.S. Cl.
CPC ...... *G06F 16/2365* (2019.01); *G06F 16/2379* (2019.01); *G06Q 20/02* (2013.01);
(Continued)

(58) Field of Classification Search
USPC ........................................................ 707/694
See application file for complete search history.

(56) References Cited

U.S. PATENT DOCUMENTS

| | | |
|---|---|---|
| 7,636,703 B2 | 12/2009 | Taylor |
| 7,840,482 B2 | 11/2010 | Singla et al. |

(Continued)

FOREIGN PATENT DOCUMENTS

| | | |
|---|---|---|
| WO | 2008/154306 | 12/2008 |
| WO | 2011/134975 | 11/2011 |
| WO | 2012/079041 | 6/2012 |

OTHER PUBLICATIONS

Title: Enhancing Accountability and Trust in Distributed Ledgers Authors: Maurice Herlihy et al. Publication Date: Jun. 23, 2016 (Year: 2016).*

(Continued)

*Primary Examiner* — Bennett M Sigmond
*Assistant Examiner* — Yongsik Park
(74) *Attorney, Agent, or Firm* — Lempia Summerfield Katz LLC

(57) ABSTRACT

The disclosed embodiments relate to implementation of a syntax for altering one or more rules by which a blockchain may be modified wherein the software implementing each client of a blockchain network are programmed to be responsive to requests or directives to alter one or more rules by which blocks may be added to a blockchain responsive to transactions received for storage therein, the requests/directives being processed by the client as a transaction and added to the block in accordance with the current state of the operating rules, thereby adding a new rule or modifying an existing rule for subsequent operation of the client.

23 Claims, 11 Drawing Sheets

Related U.S. Application Data continuation of application No. 16/513,097, filed on Jul. 16, 2019, now Pat. No. 11,314,722, which is a continuation of application No. 15/392,389, filed on Dec. 28, 2016, now Pat. No. 10,417,217.

(60) Provisional application No. 62/371,300, filed on Aug. 5, 2016.

(51) Int. Cl.
  *G06Q 20/06* (2012.01)
  *G06Q 40/04* (2012.01)
(52) U.S. Cl.
  CPC ......... *G06Q 20/0658* (2013.01); *G06Q 40/04* (2013.01); *G06Q 40/042* (2025.08); *G06Q 2220/00* (2013.01)

(56) References Cited

U.S. PATENT DOCUMENTS

| | | | |
|---|---|---|---|
| 7,921,046 B2 | 4/2011 | Parsons et al. | |
| 7,954,114 B2 | 5/2011 | Chamberlain et al. | |
| 8,069,102 B2 | 11/2011 | Indeck et al. | |
| 8,407,122 B2 | 3/2013 | Parsons et al. | |
| 8,458,081 B2 | 6/2013 | Parsons et al. | |
| 8,548,900 B1 | 10/2013 | Glackin et al. | |
| 9,608,829 B2 | 3/2017 | Spanos et al. | |
| 2004/0186803 A1 | 9/2004 | Weber et al. | |
| 2005/0149428 A1 | 7/2005 | Gooch et al. | |
| 2006/0095360 A1 | 5/2006 | Apple et al. | |
| 2006/0106707 A1 | 5/2006 | Shetty et al. | |
| 2007/0118460 A1 | 5/2007 | Bauerschmidt et al. | |
| 2008/0010183 A1 | 1/2008 | Holmes et al. | |
| 2008/0126853 A1 | 5/2008 | Callaway et al. | |
| 2009/0012892 A1 | 1/2009 | Biase | |
| 2009/0171723 A1 | 7/2009 | Jenkins | |
| 2009/0182683 A1 | 7/2009 | Taylor et al. | |
| 2009/0287628 A1 | 11/2009 | Indeck et al. | |
| 2010/0153254 A1 | 6/2010 | Shalen | |
| 2010/0241758 A1 | 9/2010 | Oddie et al. | |
| 2011/0047098 A1 | 2/2011 | Erlanger | |
| 2011/0145447 A1 | 6/2011 | Dimond | |
| 2011/0178911 A1 | 7/2011 | Parsons et al. | |
| 2011/0178912 A1 | 7/2011 | Parsons et al. | |
| 2011/0178917 A1 | 7/2011 | Parsons et al. | |
| 2011/0178918 A1 | 7/2011 | Parsons et al. | |
| 2011/0178919 A1 | 7/2011 | Parsons et al. | |
| 2011/0178957 A1 | 7/2011 | Parsons et al. | |
| 2011/0179050 A1 | 7/2011 | Parsons et al. | |
| 2011/0184844 A1 | 7/2011 | Parsons et al. | |
| 2011/0246351 A1 | 10/2011 | Sulavka | |
| 2011/0264578 A1 | 10/2011 | Chapman et al. | |
| 2011/0320335 A1 | 12/2011 | Gorelik et al. | |
| 2012/0047062 A1 | 2/2012 | Robinson | |
| 2012/0089496 A1 | 4/2012 | Taylor et al. | |
| 2012/0089497 A1 | 4/2012 | Taylor et al. | |
| 2012/0095893 A1 | 4/2012 | Taylor et al. | |
| 2012/0246052 A1 | 9/2012 | Taylor et al. | |
| 2012/0259757 A1 | 10/2012 | Nager | |
| 2012/0290460 A1 | 11/2012 | Curry, Jr. et al. | |
| 2013/0030963 A1 | 1/2013 | Cramer et al. | |
| 2013/0226764 A1 | 8/2013 | Battyani | |
| 2014/0143121 A1 | 5/2014 | Stevens | |
| 2014/0279342 A1 | 9/2014 | Maynard | |
| 2014/0289094 A1 | 9/2014 | Gaber et al. | |
| 2015/0127512 A1 | 5/2015 | Studnitzer et al. | |
| 2016/0028552 A1 | 1/2016 | Spanos et al. | |
| 2016/0292672 A1* | 10/2016 | Fay | G06Q 20/4014 |
| 2016/0321654 A1* | 11/2016 | Lesavich | H04L 67/104 |
| 2017/0005804 A1* | 1/2017 | Zinder | H04L 9/3239 |
| 2017/0161734 A1* | 6/2017 | Bankston | G06Q 20/405 |
| 2017/0206523 A1* | 7/2017 | Goeringer | G06Q 20/409 |
| 2017/0221029 A1* | 8/2017 | Lund | G06Q 20/1235 |
| 2017/0232300 A1* | 8/2017 | Tran | G06F 1/163 |
| | | | 434/247 |
| 2017/0236123 A1* | 8/2017 | Ali | G06Q 20/3825 |
| | | | 705/75 |
| 2017/0293669 A1 | 10/2017 | Madhavan | |
| 2017/0295023 A1 | 10/2017 | Madhavan et al. | |
| 2017/0337534 A1* | 11/2017 | Goeringer | G06Q 20/06 |
| 2017/0346693 A1* | 11/2017 | Dix | H04L 41/0803 |
| 2018/0082296 A1 | 3/2018 | Brashers | |
| 2018/0276626 A1 | 9/2018 | Laiben | |
| 2019/0073666 A1 | 3/2019 | Ortiz | |
| 2019/0080392 A1 | 3/2019 | Youb | |

OTHER PUBLICATIONS

"Central Processing Unit", Wikipedia, https://en.wikipedia.org/wiki/Central_processing_unit, Feb. 27, 2009.
"Data Transmission", Wikipedia, http://web.archive.org/web/20090201120014/http://en.wikipedia.org/wiki/Data_transmission, Feb. 1, 2009.
"Distributed Concurrence Ledgers", Whitepaper, Packet Dynamics LLC, 7 pages, Feb. 23, 2016.
"Ethereum", Wikipedia, 7 pages, downloaded Jun. 2, 2016, https://en.wikipedia.org/wiki/Ethereum.
"Ethereum", Wikipedia, https://en.wikipedia.org/wiki/Ethereum, Jun. 2, 2016.
"High Performance Trading - Deployment of Leading Edge Technology Thinking", Argon Design, 2 p. 2013.
"Logic Components", Oklahoma State University, SAS Institute Inc., http://web.archive.org/web/20070108163801/ http://www.okstate.edu/sas/v8/sashtml/qsim/chap2/sect4.htm, Jan. 8, 2007.
"Real-time Operating System", Wikipedia, 6 pages, http://en.wikipedia.org/wiki/Real-time_operating_System, Retrieved May 19, 2013.
"Solace Message Routers and Cisco Ethernet Switches: Unified Infrastructure for Financial Services Middleware", White Paper, 15 pages, 2010, Cisco Systems, Inc.
"What is a Real-Time Operating System (RTOS)?", National Instruments, 2 pages, Oct. 2, 2012.
Benjamin Geib, "Investigating Low Latency Trading with an HT Enabled FPGA", Universitat Heidelberg, 17 pages, Aug. 2, 2011.
Bitcoin Developer Guide, obtained from https://bitcoin.org/en/develpoer-guide#block-chain, available as early as May 31, 2017.
C. Leber et al., "High Frequency Trading Acceleration Using FPGAs", International Conference on Field Programmable Logic and Applications, 317-322, 2011.
Christian Cachin, Architecture of the Hyperledger Blockchain Fabric, from https://pdfs.semanticscholar.org, Jul. 2016.
Cisco Systems, Inc., "Design Best Practices for Latency Optimization", 8 pages, 1992-2007.
Corvil, "Nanosecond Latency Management", Whitepaper, 10 pages, 2011.
Decred Business Brief, available as early as Aug. 23, 2018, 2 pages, https://decred.org.
Decred- Autonomous Digital Currency; Decred is an Autonomous Digital Currency from https://www.decred. org/#mission, Aug. 22, 2018.
Digitial Asset's proposed code contribution to the Linux Foundation's Hyperledger Project written in Java and Scala, Digital Asset, 5 pages, retrieved on Mar. 31, 2016, https://github.com/DigitalAssetCom/hlp-candidate.
Dr. Gideon Greenspan, "MultiChain Private Blockchain—White Paper", Coin Sciences Ltd, 17 p. 2015.
Ethereum Project, Ethereum, 12 pages, downloaded Jun. 2, 2016, https://www.ethereum.org/.
Examination Report from EP Application No. 17752226, Jul. 13, 2021, EP.
Garner, Bennett; What is Decred? The Lowdown on Decentralized Blockchain Goverance; https://coincentral.com/decred-lowdown-decentralized-blockchain; Dec. 10, 2017.
Gavin Andresen, "Blockchain Rule Update Process", 7 pages, https://gist.github.com/gavinandresen/2355445, Apr. 10, 2012.
Gendal, "Introducing R3 Corda™: A Distributed Ledger Designed for Financial Services", https://gendal.me/2016/04/05/introducing-r3-corda-a-distributed-ledger-designed-for-financial-services/, Apr. 5, 2016.

(56) References Cited

OTHER PUBLICATIONS

George Howard, "Imogen Heap Gets Specific About Mycelia: A Fair Trade Music Business Inspired by Blockchain", Forbes, 12 pages, Jul. 28, 2015.

George Howard, "Imogen Heap's Mycelia: An Artists' Approach for A Fair Trade Music Business, Inspired by Blockchain", Forbes, 19 pages, Jul. 17, 2015.

GitHub - Tezos/tezos: A Self-Amending Cryptographic Ledger, Dec. 19, 2017, from https://github.com/tezos/tezos.

Harry Halpin; Updatechain: Using Merkle Trees for Software Updates; Computer and Network Security (Spring 2016), May 11, 2016.

Herlihy et al., "Enahncing Accountability and Trust in Distributed Ledgers", Brown University and Oracle Labs, Jun. 27, 2017.

Hyperledger Project, 2 pages, retrieved Mar. 31, 2016, https://github.com/hyperledger/hyperledger.

International Search Report and Written Opinion, from PCT/US2014/064001, Feb. 13, 2015, WO.

International Search Report and Written Opinion, from PCT/US2017/045018, Oct. 17, 2017, WO.

International Search Report in International Patent Application No. PCT/AU2009/000849, dated Aug. 6, 2009, 4 pages.

International Search Report in International Patent Application No. PCT/EP2011/056611, Jan. 20, 2012, 3 pages.

Ken Shirriff; Hidden Surprises in the Bitcoin Blockchain and How They are Stored: Nelson Mandela, Wikileaks, Photos and Python Software; obtained from http://www.righto.com; Feb. 2014.

L.M. Goodman, Tezos—A Self-Amending Crypto-Ledger, Sep. 2, 2014, White Paper.

Leber et al., "How to Get World's Best Possible Ultra Low Latency in High Frequency Trading (Tick to Trade Method)", 2012.

Liebkind, Joe; What is Qtum? How the Cryptocurrency Differs from Bitcoin, https://www.investopedia.com/news/what-qtum; Feb. 5, 2018.

Linda Xie, A Beginner's Guide to Decred, https://medium.com/@linda.xie/a-beginners-guide-to-decred, Oct. 16, 2017.

Lockwood, et al., "A Low-Latency Library in FPGA Hardware for High-Frequency Trading (HFT)", 2012 IEEE 20th Annual Symposium on High-Performance Interconnects, pp. 9-16, 2012.

LOW-LATENCY.COM, "Groundbreaking Results for High Performance Trading with FPGA and x86 Technologies", Newswire, 2 pages, Sep. 25, 2013.

McLean et al., "Demystifying Blockchain and Distributed Ledger Technology—Hype or Hero?", Morrison & Foerster, 8 pages, Apr. 5, 2016.

Open Blockchain Whitepaper, 10 pages, retrieved Mar. 31, 2016, https://github.com/openblockchain/obc-docs/blob/master/whitepaper.md.

Patrick Dai et al.; Smart-Contract Value-Transfer Protocols on a Distributed Mobile Application Platform, Qtum Foundation and Large-Scale Systems Group, Tallinn University of Technology; Mar. 6, 2017.

Qtum Blockchain Economy Whitepaper, Qtum Foundation, Mar. 31, 2017.

Qtum Foundation, Decentralized Goverance Protocol to Manage Blockchain Network, from https://www.prnewswire.com/news-releases/qtum-introduces, Jun. 6, 2017.

Risca et al., "Trading Floor Architecture", Cisco Systems, 36 pages, 2008.

Robert Kowalski, "Algorithm = Logic+Control", Communications of the ACM, vol. 22, No. 7, 13 pages, Jul. 1979.

Scott Caudell, "Co-location, Performance Management and Technology Innovation for Ultra-low Latency Trading", High Performance Technologies for Trading, Issue 5, 5 pages, Apr. 2010.

Tezos Crowdfuding—Governance, Dec. 19, 2017, from https://www.tezos.com/governance.

Tezos Crowdfunding—Technology, Decmeber 19, 2017, from https://ww.tezos.com/technology.

Tezos Crowdfunding, A New Digital Commonwealth, Dec. 19, 2017, from https://www.tezos.com.

The Periodic Table of Elements, The Elements Project, 1 page, retrieved Mar. 31, 2016, https://www.elementsproject.org/elements/.

The World's Fastest and Most Secure Payment System, Ripple, 4 pages, retrieved Mar. 31, 2016, https://github.com/ripple/rippled.

Tschorsch et al., "Bitcoin and Beyond: A Technical Survey on Decentralized Digital Currencies", IEEE Communications Surveys & Tuitorials, vol. 18, No. 3, Third Quarter, 40 pages, 2016.

Tse et al., "High Frequency Trading—Measurement, Detection and Response", Trading Strategy, 12 pages, Dec. 6, 2012.

Tse et al., "High Frequency Trading—The Good, The Bad, and The Regulation", Trading Strategy, 7 pages, Dec. 5, 2012.

Wikipedia, "Real-time Business Intelligence", 4 pages, http://en.wikipedia.org/wiki/Real-time_business_intelligence, Retrieved May 19, 2013.

Xiwei Xu et al., The Blockchain as a Software Connector, from http://design.inf.usi.ch/sites/default/files/biblio/, May 25, 2016.

* cited by examiner

<u>701</u>

Version 703

Previous Block Hash 705

Merkle Root 707

Timestamp 709

Difficulty Target 711

Nonce 713

TX Count 715

RX Count 717

Transaction Array 719

Rule Array 721

FIG. 7

SYSTEMS AND METHODS FOR BLOCKCHAIN RULE SYNCHRONIZATION

CROSS REFERENCE TO RELATED APPLICATIONS

This application is a continuation under 37 C.F.R. § 1.53(b) of U.S. patent application Ser. No. 17/700,059 filed Mar. 21, 2022, now U.S. Pat. No. 11,995,067, which is a continuation under 37 C.F.R. § 1.53(b) of U.S. patent application Ser. No. 16/513,097 filed Jul. 16, 2019, now U.S. Pat. No. 11,314,722, which is a continuation under 37 C.F.R. § 1.53(b) of U.S. patent application Ser. No. 15/392,389 filed Dec. 28, 2016, now U.S. Pat. No. 10,417,217, which claims the benefit of U.S. Provisional Application Ser. No. 62/371,300 filed Aug. 5, 2016, the entire disclosures of which are herein incorporated by reference in their entirety.

BACKGROUND

Various electronic mechanisms are used for storing data which multiple parties need to access, modify and/or maintain, including electronic ledgers and database managements systems.

A ledger may be a collection of entries (obligations, assertions, debts, credits, etc.) in a notebook or other physical or electronic form and are akin to a transaction log whereby the current "state" of a ledger may be ascertained by netting or otherwise totaling all of the entries up to the current time period. For example, "Party A loans $X to Party B" could be an entry representative of a transaction in a ledger. "Party B repays $X to Party A" may be a subsequent entry of another transaction in that ledger. The net result of these two entries is the extinguishing of the debt of B to A. Ledgers typically utilize double-entry book keeping whereby separate ledger entries, or separate ledgers, are maintained for each side (account/party) to a transaction and transactions are recorded as a pair of opposing transactions, e.g. credits vs. debits, to each respective account/party, either in the same ledger or in separate ledgers, each maintained by the respective party.

Ledgers may be held by individual parties, or ledgers may contain entries for multiple parties and be replicated/distributed amongst a variety of sources. A ledger which comprises many distributed copies may be referred to as a replicated ledger. An example of an electronic replicated ledger is the "blockchain" methodology employed, for example, by the Bitcoin digital currency. Blockchain is an electronic public replicated ledger in which transactions, such as those involving the cryptographic currency Bitcoin, are recorded.

A blockchain database is implemented by software, which may be referred to as blockchain software, which is executed by each computer client, which may be referred to as a node or miner, which is participating in the particular overall system, e.g. digital currency payment system, for which the data stored in the blockchain is being used, e.g. to track payments of digital currency, etc. Generally, the software running on each node maintains a copy/replica of the blockchain data/database. The combination of the blockchain database and the software which maintains it may collectively be referred to simply as a blockchain or a replicated blockchain. The data stored in a blockchain is typically coalesced, collected or grouped together, such as on a quantitative and/or periodic basis, into blocks where each block is coupled or linked, such as in a cryptographic manner, with a prior block forming a chain of blocks which may continue to grow as new data is added.

Each of the replicated blockchains communicates with the others via a network, such as the Internet. It will be appreciated that the term network, in addition to referring to the communications medium by which replicated blockchains communicate, may also be used to refer to the collection of blockchain clients which are implementing a particular system using a blockchain database for data storage and other functions, which may also be referred to as a blockchain network, or for example, in the case of the Bitcoin implementation of a blockchain, the Bitcoin network.

The blockchain software further implements particular rules for allowing/validating modifications, e.g. addition of new transactions, to the blockchain database by the operator of the particular client as well as for validating and implementing modifications to the blockchain database received from other clients. These rules are generally defined by the type of system the blockchain network is being used to implement, e.g. a system for payment of digital currency, and are coded into the software. In order to change these rules, the software must be updated.

For example, one implementation of a blockchain network is Bitcoin which is a system for digital payment transactions, which may be referred to as the Bitcoin network. Generally, users wishing to make or receive payments of a digital currency, called Bitcoin, construct transaction messages which document a transaction, e.g., the payee, the payor, the amount to be paid/received, source(s) of funds, a script detailing a cryptographic authentication from one or more parties authorized to allocate the funds, etc. The transaction is then submitted to the Bitcoin network for validation, e.g. to confirm available funds, authenticity of the payor, etc. Each node of the network receives the transaction and executes the rules implemented by the Bitcoin blockchain software to validate the transaction, e.g. ensure the payor has unspent funds (calculated from previous unspent transaction outputs) to cover the transaction and that no one is trying to spend the same Bitcoins twice, and then, if validated, record it in the blockchain database and notify other nodes of the modification thereto.

A blockchain network may include miners and nodes. A node may contain a portion of the blockchain (partial node) or the whole blockchain (full node). The node may be configured to check if new transactions are acceptable, and or for example, to check that number of Bitcoins that currently are available for an address. A miner may be configured as a separate entity or as a node as above (with complete or partial data of the blockchain) that creates new blocks that confirm transactions. The new blocks, if found by a miner, are added to the blockchain and are made available (published) on the nodes. Miners are configured to find the new blocks using an algorithm and earn a reward for found blocks. Miners are thus incentivized and rewarded for their effort via the award of a defined amount of Bitcoins for being the first to complete the validation/blockchain modification process, which, by design is a non-trivial process. A blockchain network may include a plurality of miners, a plurality of nodes, and a plurality of mining nodes, e.g. nodes that are also configured as miners. The plurality of nodes may run node software, the miners may run mining software, and the mining nodes may run a combination of the node and mining software. The term "blockchain client" may be used herein to describe miners, nodes, or mining nodes. The term "blockchain software" may be used herein to describe mining software, node software, or mining node software.

In particular, in the Bitcoin blockchain, a block may only be added by solving a cryptographically defined computation based on the data to be stored in the block, data related to the prior block and an arbitrary value selected by the miner with a result of the computation having to meet specific requirements in order to be accepted. As the necessary computations take time and it may take many attempts by the miner to achieve a suitable result, in conjunction with the reward for success, the Bitcoin blockchain creates a competitive environment in which miners compete, e.g. using computing power, to be the first to successfully add a new block to the blockchain.

The Bitcoin blockchain operates completely transparently, so all data is transmitted to, and is readable by, all participants in the Bitcoin system. That is, each party in the Bitcoin system, with some exceptions, maintains a copy of the ledger, stored by the blockchain, in which all transactions are recorded, referred to as "full replication." In the case of Bitcoin, this replicated ledger makes all transactions "open transactions" and viewable by all participants on the blockchain network and is a necessary property required to prevent double spending of Bitcoins, i.e., parties attempting to send the same Bitcoin to multiple parties. This property of visibility of all transactions in the Bitcoin network is also a drawback of a blockchain, because it does not allow for the confidentiality of transactions. Every participant in the Bitcoin network has access to every transaction on the blockchain. This facilitates the ability to track digital assets, e.g. Bitcoins. The integrity of transactions recorded in each ledger may be cryptographically protected, i.e. "signed," via a transacting party's or parties' privately held cryptographic key(s). The transactions of funds from an address may require authorization from one or more parties that may sign, e.g. give authorization, through use of one or more cryptographic keys. In certain transactions, multiple parties may be required to authorize allocation of funds. For example, for a multi signature address, two or more parties may be required to authorize allocating funds from the address. Additional, more complex options may require certain conditions to be met for one of the two or more parties to provide authorization. In an example, a multi signature address may require that two out of three parties authorize transactions, or three out of five, or five out of seven, etc. In a scenario that only a single signature is used, if someone were to steal a blockchain/Bitcoin user's private key, the thief could have all of the information necessary, e.g. the transactional record and a cryptographic key thereto, to be able to see all of the transactions to which the user is a party, and the thief would be able to create transactions using the private key without the true owner of the private key's consent. Multiple signatures, as described above, may help prevent theft by requiring that the transaction be signed by multiple keys and as such require the thief to possess each key in order to authorize transactions.

Using the replicated ledgers of blockchain along with cryptographically linking/chaining the transactions stored therein enables all users to ensure the reliability of the transaction data, i.e. that transactions are recorded accurately and subsequent thereto, protected from alteration, as each user has a copy of all of the transactions and any unintended alterations to a transaction, e.g. via errors or fraudulent activity, are readily detectable via both the cryptographic discrepancies within the chained transactions that would be created as well as the discrepancies that such alterations will create among the various copies of the blockchain ledger.

Financial instrument trading systems are one example of complex systems that utilize databases according to a System of Record ("SOR") model and which may be implemented using blockchain as described above. Generally, a financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed and matched, and open positions are settled each day until expired (such as in the case of an option), offset or delivered. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the Clearing House is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g. instrument, traded on the electronic trading system and generally defines or otherwise represents the state of the market for that product, i.e. the current prices at which the market participants are willing to buy or sell that product. As such, as used herein, an order book for a product may also be referred to as a market for that product.

In a futures exchange both trading and clearing may operate under a Central Counter Party ("CCP") model, where the futures exchange functions as a counter party to each trade and to the clearing of each trade, referred to above as a novation. CCPs benefit both parties in a transaction because the parties bear most of the credit risk. In a scenario outside of a financial exchange, where two individuals deal with one another by themselves, the buyer bears the credit risk of the seller, and the seller bears the credit risk of the buyer. Conversely, when a CCP is used the credit risk that is held against both buyer and seller is coming from the CCP. One consequence of a CCP model is that all communication and transactions must flow through the CCP, i.e. the CCP is the SOR, and thus information and trading may only be as fast as the CCP may process it and transmit it out to the interested parties. Records are usually kept by the CCP in a database as the source of truth and communicated to other parties using messaging. The CCP's client, e.g. a clearing member, may further have its own database of at least a subset of these records and periodically, typically daily, may reconcile them with the CCP. Further, the customers of a clearing member may have their own database, necessitating similar reconciliation. This effectively serializes the distribution of data from the CCP to all interested parties and increases the latency thereof.

As will be appreciated, replicated electronic ledgers, such as blockchain, may be used to maintain transactional records reflecting trades, credit, payment etc. Examples of using such electronic replicated ledgers is disclosed in U.S. patent application Ser. No. 15/166,829, entitled "BILATERAL ASSERTION MODEL AND LEDGER IMPLEMENTATION THEREOF", and Ser. No. 15/166,838, entitled "BILATERAL ASSERTION MODEL AND LEDGER IMPLEMENTATION THEREOF", herein incorporated by reference in their entirety.

BRIEF DESCRIPTION OF THE DRAWINGS

FIG. 7 depicts an illustrative embodiment of a block of the blockchain system of FIG. 6.

DETAILED DESCRIPTION

Figure 1:
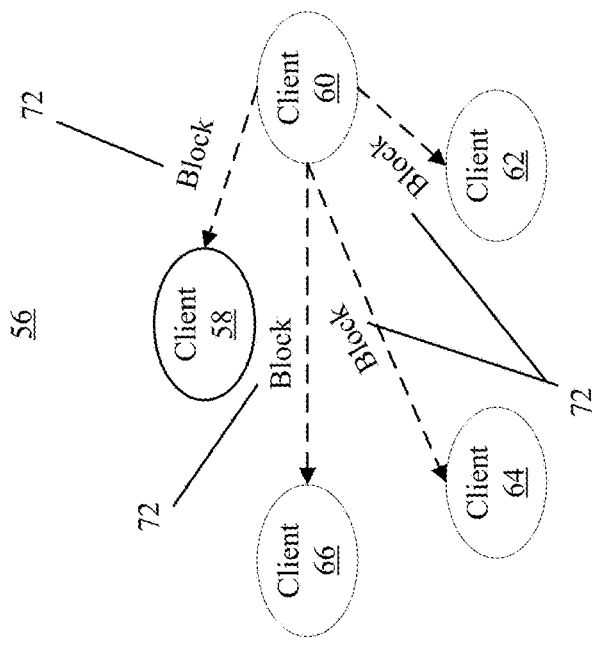
FIG. 1 depicts an example operation of an illustrative implementation of a blockchain according to one embodiment.
Figure 1:
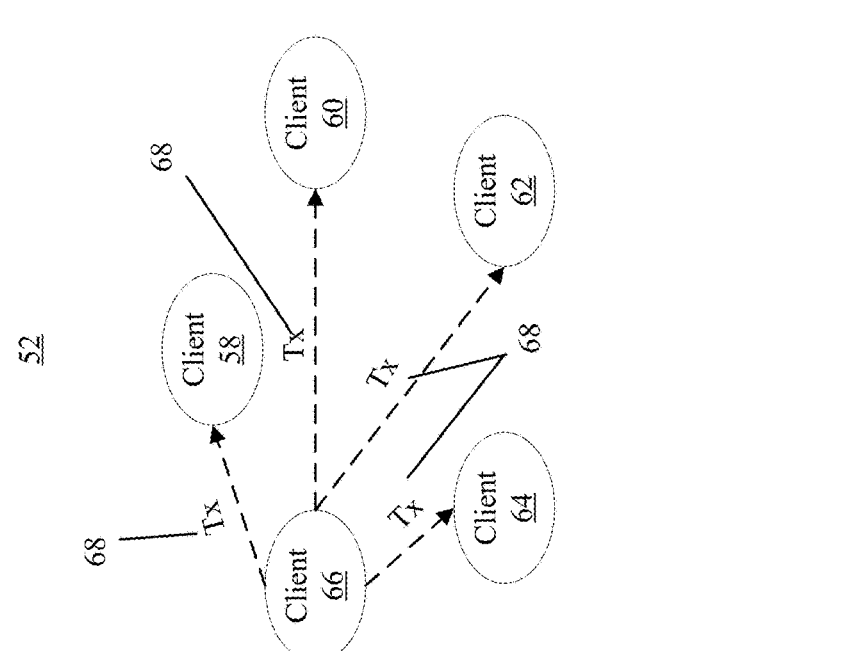

The disclosed embodiments relate to implementation of a syntax for altering one or more rules by which a blockchain may be modified wherein the software implementing each node of a blockchain network are programmed to be responsive to requests or directives to alter one or more rules by which blocks may be added to a blockchain responsive to transactions received for storage therein, the requests/directives being processed by the node as a transaction and added to the block in accordance with the current state of the operating rules, thereby adding a new rule or modifying an existing rule for subsequent operation of the node.

In order for a blockchain to function properly, each transaction may be required to follow one or more validation rules. Using existing blockchain technology, the validation rules may be set forth initially and only changed through consensus mechanisms. One example of validation rules may be seen in the Bitcoin protocol, a protocol that uses blockchain technology. Bitcoin generally operates as follows:

1. Users of the blockchain create transactions and submit the transactions.
2. A peer-to-peer network of nodes relay the transactions, often after validating the transactions.
3. Entities compete to construct the next block in the blockchain, which contains a list of recently submitted transactions not yet included in a block. Using Bitcoin terminology, these are called miners. Each miner selects transactions, checks the transactions for validity, and, if valid, includes the transactions in the next block to be added to the blockchain. This block includes a reference, e.g. a cryptographic hash, of the prior block's header, thus adding a link to that block, hence forming a "chain" of blocks.
4. If a miner succeeds in constructing the next block, the miner utilizes the network of nodes to publish the block to all other nodes and miners.

5. The nodes may validate the block before relaying it, and the miners may validate the block before accepting it.

6. The process repeats, with miners now attempting to create the next block in the blockchain that would link to the newly created block.

This methodology is common across many forms of blockchain technology. Different protocols may differ in their technical protocols, the methods used to determine which entity may add the next block, e.g. proof-of-work, proof-of-stake, Practical Byzantine Fault Tolerance, etc. The proposed system is generally applicable to all such blockchain technologies.

The validation rules to add a transaction to the blockchain for Bitcoin are well defined. Examples of such rules for Bitcoin include but are not limited to:

Transaction inputs must only spend Bitcoin transactions that are unspent.

The sum of transaction outputs must be less than or equal to the sum of transaction inputs. (Any unspent Bitcoin represents a fee to the miner.)

The transaction must prove, via a script, that it is authorized to spend the inputs; this usually requires one or more digital signatures for each input.

The miner may create a transaction without inputs for a certain amount determined by a mathematical formula (e.g. 12.5 Bitcoin, which will decrease at a later date to 6.25 Bitcoin, etc.) along with the sum of mining fees for all transactions within each block that serves as a block creation reward.

Transaction amounts must be expressed with no more than 8 decimal places.

The total block size cannot exceed 1 MB.

All blockchain clients (e.g. miners and/or nodes) validating transactions or blocks must agree upon the rules that define whether a block is valid. If, for example, a blockchain client includes a transaction in block 123 that has an input that was spent (e.g. no longer available) in a prior block, then other blockchain clients may refuse to relay the block, and any blockchain client seeing that block may choose not to accept it. In this example, blockchain clients will attempt to create, according to the rules, a different block 123 that does not include the invalid transaction. On successful mining, i.e. upon computation of an acceptable result according to the rules, the block will be relayed and accepted, and miners will work to create block 124 that links to the correct block 123 in the chain. Because the vast majority of miners agree on the rules, the miners will produce a longer chain of blocks based on valid transactions, and this will rapidly overtake the chain produced by the miner that mined the invalid block 123. The Bitcoin network prefers the longest valid chain, so this process generally results in a chain containing only valid transactions according to the rules the vast majority of miners use.

FIG. 1 depicts an example operation of an illustrative implementation 50 of the Bitcoin blockchain which may be used to track the logical movement of digital assets among the participants, e.g. Bitcoins, and which may include three stages of operation as shown, a transaction stage 52, a proof of work stage 54, and a block confirmation stage 56. FIG. 1 also shows blockchain clients 58, 60, 62, 64, and 66, representative of participants in the Bitcoin blockchain, e.g. miners, nodes, or mining nodes. In the transaction stage 52, blockchain client 66 communicates a transaction 68 to every other blockchain client. A transaction may consist of one participant to the transaction at a blockchain client sending a Bitcoin to another participant to the transaction at a different blockchain client. As the other blockchain clients 58, 60, 62, 64 receive transaction 68, the transaction is validated and then grouped together with other prior transactions into a block. A block may include a number of transactions. A block may also contain just a single "coinbase" transaction that awards a number of Bitcoins to a blockchain client. A block may be opened once a proof of work solution to a prior block is found, either by a blockchain client 48, 60, 62, 64, 66 solving proof of work 54, or a blockchain client 48, 60, 62, 64, 66 being informed of another blockchain client having found a valid block. A blockchain client may begin doing proof of work with or without a single transaction. As more and more transactions arrive, the blockchain clients, e.g. miners will try to fill the block they are trying to solve with these transactions. When the miners hit a limit, the miners continue, although new transactions that arrive may replace older transactions in the block the miners are trying to solve if the new transactions offer higher miners' fees.

During the proof of work stage 54, blockchain clients 58, 60, 62, 64, and 66 that have begun the proof of work solving process 70 will attempt to solve a mathematical equation which allows the blockchain clients 58, 60, 62, 64, and 66 to confirm the veracity of the block via validation of a solution to the mathematical equation. The mathematical equation to be solved is asymmetric, i.e. it is an equation which is difficult to solve, e.g. resource/time intensive, but where the solution is easy to validate, such as the computation of a particular hash value. Once one of the blockchain clients 58, 60, 62, 64, and 66 confirms the veracity of a block, the solving blockchain client 58, 60, 62, 64, and 66 broadcasts the confirmed block to every other blockchain client 58, 60, 62, 64, and 66 at the block confirmation stage 56. As shown in the exemplary operation depicted in FIG. 1, miner 60 of the blockchain clients completed the proof of work involving the transaction 68 and broadcasts the block 72 to each other node of the blockchain clients.

Each of the transactions processed and added to the blocks are checked against the validation rules described above to verify that the transactions are proper. Bitcoin, and most other blockchain technologies, implement these rules in source code in the blockchain software that is used by the miners and/or nodes. E.g. each blockchain client stores the rules in local software. Changing the rules requires that a near unanimous number of blockchain clients must accept and run the updated software. Otherwise, a "fork", i.e. different clients adding a different version of a block at the same location in the blockchain thereby creating a deviation therebetween, may occur.

For example, the software Miner A uses includes a validation rule that transactions may use at most 8 decimal places. The software Miner B uses includes a validation rule that transactions may use at most 10 decimal places. Other miners likewise share the confusion such that a significant number of the miners follow each of the respective rules to validate transactions. A user submits a transaction sending 1.0000000001 Bitcoin, e.g. using 10 decimal places. Miner A will ignore the transaction as invalid, but Miner B accepts it, attempting to include it in the next block. If Miner B succeeds in mining the block (in the Bitcoin protocol, this would require creating a block with a SHA-256 hash less than a target amount) Miner B publishes this Block 123 to the entire network. However, Miner A sees this block and refuses to accept it as legitimate because it contains a transaction with 10 decimal places (e.g. not valid according to the rules Miner A believes to be true at the time). Miner A tries to mine its own version of Block 123 not including the transaction it considers invalid. If Miner A also produces a version of Block 123, Miner A will subsequently publish a different version of Block 123 (called 123') to the network. At this point, there are two versions of Block 123 that have been published to the network and two groups of miners that disagree on which version of Block 123 is valid.

In general, the blockchain clients reach consensus by considering the longest valid chain to be correct. However, because disagreement concerning the rules exists among miners in this example, some will work to extend the chain following block 123, and others will work to extend the chain following block 123'. Miners attempting to extend the chain following the 123' block consider 10 decimal place transactions invalid, so the miners will never accept block 123 or any block with a higher block number that includes block 123 in its chain, regardless of the length of that chain. Miners attempting to extend the chain following the 123 fork may be willing to consider the 123' fork as valid, but the miners would likely abandon the 123 fork for the 123' fork only if the 123' fork exceeded the 123 fork in length. Even if this did occur, these miners would observe that the transaction with 10 decimal places that caused the fork does not exist in the 123' fork, and the miners would very likely attempt to mine blocks that include it at a later time, causing yet another fork.

If the blockchain clients disagree on the rules for validating transactions, the results may be catastrophic. A blockchain is expected to provide an immutable, single source of truth, but a party validating whether the 1.0000000001 Bitcoin transaction was committed to a block may find a different answer depending upon which fork of the blockchain that the party uses. With two competing ledgers, double-spending is possible, whereby a dishonest party may attempt to spend the same unspent Bitcoin transaction twice, but with a different recipient, on each of the two different forks.

To avoid the above described example fork, the validation rules for a blockchain have been difficult to change. Bitcoin, for example, is a decentralized digital currency with no defined authority that is empowered to change the validation rules. This type of blockchain technology is referred to as a public blockchain. Rule changes are difficult to achieve and doing so requires both near unanimous consensus as well as near universal software updates to prevent the above described types of fork scenarios.

In the example above, if all the miners wanted to change the allowed decimal places from 8 to 10, appropriately updated blockchain software would be released that, when used for mining, indicates its willingness to support the proposed change by adding information in blocks it mines. For example, during a period of time subsequent to being implemented, the modified software broadcasts messages to other entities, e.g. as part of communication information about blocks, indicating that it is ready to implement the new rule and accept blocks from other entities created subject to the new rule. The software would then watch the blockchain, or otherwise wait to receive similar messages from the other entities, and once it sees a certain threshold, e.g. 95%, of all blocks mined in a time period, e.g. 2 weeks, or, alternatively messages from 51% or more of all nodes, contain information that the party mining supports the change, it would begin using the updated rule after a certain time period, e.g. 2 weeks, in the future. This gives miners comprising, in this example, less than 5% of the computing power who do not run software supporting the change a chance to upgrade their software so as to prevent a fork once the change is implemented. This process is extremely inefficient and cannot address rapidly changing market conditions.

The inability of a blockchain protocol such as Bitcoin, to be altered may be considered a feature that is appreciated by the users of Bitcoin. A protocol that cannot be easily changed may also allow for more decentralization. Users of a protocol, for example, may prefer concrete rules that cannot be altered by a single party. A user or blockchain client may use Bitcoin with the expectation that the validation rules will not shift without the approval of a large supermajority of miners or node. Alternatively, blockchain technology may be applied to digital assets where more central control is desirable. A blockchain controlled by a central party may cover a wide range of applications across many industries. A centrally controlled blockchain may allow for alternation of the validation rules by a single party.

One alternative to a public blockchain that is centrally controlled by an entity may be referred to as a private blockchain. The following examples illustrates the benefits and downsides to a private blockchain. An example of private blockchain technology is a blockchain used to record transactions representing airline frequent flier miles. The users of frequent flyer miles acknowledge that the airline administering the frequent flyer program has the right to change the terms and conditions of the program at any point in time. This presents a number of obstacles to using an open, public blockchain like Bitcoin to exchange frequent flyer miles as a digital asset. The airline administering the frequent flyer program is not concerned with reaching consensus regarding the rules that govern the blockchain protocol.

One example of a rule change is if the airline wants to increase transaction fees to transfer airline miles between parties. If the airline uses an open blockchain protocol like Bitcoin, where anyone may act as a node or miner, the increase in transaction fees would have to be approved by the blockchain users. The rule change would require virtually every node and miner to update their software before the rule change could take effect. Otherwise, a fork, such as described above, may occur. It is infeasible to make such a change if the majority of miners and nodes are outside the direct control of the airline, seeing as the miners must update their software to allow the airline to implement its fee increase. A majority of miners may not wish to make the change to transaction fees as requested by the airline. This creates a significant obstacle to implementing this change in a timely manner.

Similarly, in another example, the airline may want to implement an identity management system to facilitate Anti Money Laundering/Know Your Customer, e.g. AML/KYC. Only parties having been vetted by the airline, or other parties (such as banks, travel agencies, etc.) may be allowed to create wallets that may hold airline miles. Certain parties may hold digital certificates that the airline designates as signers who are authorized to sign certificates that entitle users' wallets to hold airline miles. In cases where a user is found to be exchanging airline miles for criminal purposes, that user's certificate may be revoked. The airline needs a method to distribute an authorization list of valid signers of wallets and changes to that list, as well as a certificate revocation list identifying all revoked user certificates. In order for the authorization list to function, all miners must have consensus concerning these lists so that the miners only accept valid transactions.

For both of these examples, a public blockchain protocol similar to Bitcoin will not work if the airline wants to maintain central control. A private blockchain also has drawbacks. In a private or permissioned blockchain the airline may operate and control each of the parts of the system that perform transaction validations, including nodes and/or miners. Alternatively, the control of the system may be expanded to partners that the airline trusts; these partners and the airline may execute legal agreements that compel the miners to perform software updates when the airline requests that the nodes do so. The airline may enforce that only its own nodes and/or miners, and those of trusted partners, can participate in the network by utilizing a cryptographic identity that gives the nodes and miners the permission needed to operate. Nodes or miners attempting to connect to the network and perform these functions without a valid cryptographic identity would be refused. The control of the system allows the airline to coordinate updates of the validation rules on all nodes and miners at a time the airline chooses. For example, the airline may directly update software for its own nodes and/or miners. The airline may also mandate an update to the node and/or miner software used by its partners and may enforce this mandate by withholding the cryptographic keys or revoking cryptographic keys used by partners that have not complied.

Another method may be used where the airline may publish its fee schedule in a file on a website and expect all miners and nodes to query the website via the HTTP or HTTPS and enforce the fee schedule. The certificates and certificate revocation lists may also be distributed via the HTTP or HTTPS protocols to miners. While use of certificate revocation lists works well to prevent attackers who have compromised the private keys for website certificates from perpetrating further fraud, it does not work well with blockchain technology. For example, a race condition may occur whereby a miner accepts a transaction from User A, validates using the website that the wallet certificate for User A is not revoked and User A's wallet is authorized to hold miles, and successfully mines a block including User A's transaction. It gets distributed to the network. Meanwhile, the airline updates the certificate revocation list to revoke User A's certificate. Some wallets may receive the block prior to the revocation list update and accept it; others may receive the block after the revocation list update and reject it. This may lead to a fork, as described above.

A fork may also occur if a whitelist of authorized wallets were used; one miner may determine that User A's wallet address is included in the whitelist, mine a block containing User A's transaction, and the removal of User A's wallet address from the whitelist may cause some miners to accept or reject this block depending upon the time the miners checked the whitelist. Further, the state of a whitelist or certificate revocation list stored on a website at any particular point in the past cannot be audited, so one may not be able to determine whether any prior transaction involved valid wallets at the time the transaction was published to the blockchain.

Likewise, placing rule changes, such as fee changes, online via a website and expecting all miners to query the website and enforce the rules may result in the same kind of race condition as the certificate revocation list. The rule change may be possible if it states that it is valid during a point of time significantly in the future such that it is clear all miners would have checked this file before that time. But rule changes that must happen immediately, or in the near future, run the risk of being observed selectively by some miners and nodes, which may result in a fork. In any case, one cannot audit the state of the rule file at a point in the past, so it is unclear when analyzing the blockchain whether a given transaction in the past complied with the rules.

While a private blockchain may work for certain cases, the centralized nature may be less desirable for certain applications. An advantage of blockchain technology is that it allows for a trusted, decentralized ledger. With a public model similar to the one used as the Bitcoin blockchain, no entity, including the airline itself, may fraudulently take airline miles away from any user contrary to the rules of the blockchain. A participant may suffer a private key compromise, which may result in such a loss, but not based on the fraudulent administration of the blockchain. If participation in a blockchain as a miner or node is limited just to the airline or to the airline and entities closely associated with the airline, then the airline may defraud users, or may collude with the other parties to defraud users. A blockchain that allows anyone to run nodes and miners, without compelling software upgrades to change rules, offers increased security.

Embodiments provide systems and methods to synchronize rule changes such that the authority or authorities authorized to make rule changes may do so without requiring the miners and/or nodes to make software updates in order to avoid forks, and so that all blockchain users may arrive at an objective consensus of the rules valid at the time of creation for any current or prior block. Embodiments allow for the use of a public blockchain that includes reliable and centralized validation rule changes.

By using the blockchain itself to synchronize rule changes affecting it, the disclosed embodiments eliminate the need for miners and nodes to download new software that enforces new rules, which may delay implementation of said rules substantially. It also eliminates the possibility of race conditions caused by different miners and nodes querying external web sites or other sources outside of the blockchain to determine the rules, or to undergo complex and slow voting processes as with Bitcoin.

An authority who needs control over digital asset validation rule changes may utilize disclosed embodiments to exert that control without requiring that the authority implement a private or tightly permissioned blockchain, and without requiring that the authority rely upon operators of miners and nodes to install new software that changes the validation rules.

The result of operation of the disclosed embodiments is a dynamic system for facilitating rule changes that are entirely deterministic such that any miner or node, when presented with data comprising all blocks on the blockchain, may determine the validation rules effective at any point in time and may retroactively audit that all transactions in all blocks comply with all rules valid at the time the transactions were added to the blockchain.

One exemplary environment for using blockchain technology is in financial markets, and in particular, electronic financial exchanges, such as a futures exchange, such as the Chicago Mercantile Exchange Inc. (CME). In particular, an exchange may offer multiple products and contracts for purchase that may be tracked or settled using a distributed ledger. An exchange may use public blockchain technology and dynamic rules to provide a trusted but flexible system for settling trading accounts, clearing trades, or collecting and reporting financial data among others.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as the obligations occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant may have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated. Public blockchain technology provides for a trusted mechanism while a dynamic syntax for validation rules provides for the flexibility to efficiently adjust for changes in the market.

Although described below in connection with examples involving frequent flyer mileage, the methods described herein are well suited for tracking values for any variety of objects conforming to a set of rules or relationships, such as for example, determining settlement prices or tracking ownership for a variety of instruments based on a related market. Generally, the disclosed embodiments may be applicable to any computer processing system that is constrained by a variety of rules and data values.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets. The disclosed embodiments are also not limited to uses by a clearing house or exchange for purposes of enforcing a performance bond or margin requirement. For example, a market participant may use the disclosed embodiments in other fields or applications.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

Figure 2:
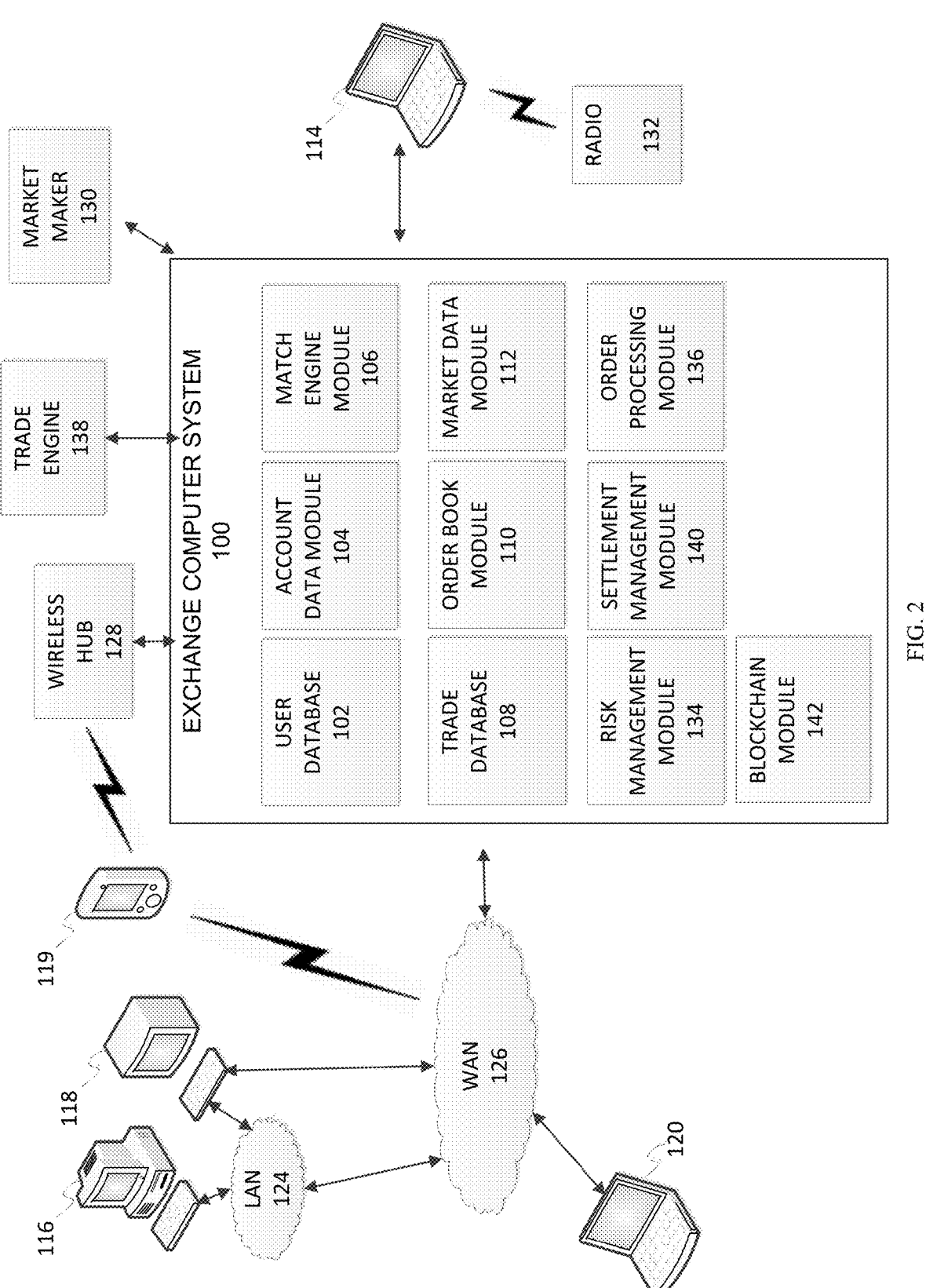
FIG. 2 depicts an illustrative computer network system that may be used to implement aspects of the disclosed embodiments.

An exemplary trading network environment for implementing trading systems and methods is shown in FIG. 2. An exchange computer system 100 receives messages that include orders and transmits market data related to orders and trades to users, such as via wide area network 126 and/or local area network 124 and computer devices 114, 116, 118, 119 and 120 as will be described below, coupled with the exchange computer system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 3. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

A blockchain module 142 may be included in the exchange computer system 100. The blockchain module 142 may be configured as a blockchain client, e.g. miner or a node in a blockchain system. A blockchain system or network may include a plurality of miners or nodes that maintain a distributed blockchain (or ledger). The exchange computer system 100 or blockchain module 142 may be configured as an administrator of the blockchain system and as such, the exchange computer system 100 or blockchain module 142 may have permissions to set or alter one or more validation rules by generating and transmitting a signed data message including the one or more changes to the validation rules for the blockchain. For a multiple signature scenario, the exchange computer system 100 may be one of the two or more parties that are required to authorize a transaction or proposed rule change. The blockchain module 142 may store the blockchain and rules for the blockchain in a blockchain datastore. The blockchain module 142 may be configured to update the blockchain by generating or validating received blocks that contain one or more transactions. The transactions may include transactional data that relates to the function or use of the exchange computer system 100 such as, for example, facilitating orders or trades between parties.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the settlement module 140, the blockchain module 142, or other component of the exchange computer system 100.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 2 includes exemplary computer devices 114, 116, 118, 119 and 120 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which the traders communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 3, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user may interact with the computer with a keyboard, pointing device, microphone, pen device or other input device now available or later developed.

An exemplary computer device 114 is shown directly connected to exchange computer system 100, such as via a TI line, a common local area network (LAN) or other wired and/or wireless medium for connecting computer devices, such as the network 220 shown in FIG. 3 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 2, an exemplary wireless personal digital assistant device ("PDA") 119, such as a mobile telephone, tablet-based computer device, or other wireless device, may communicate with the LAN 124 and/or the Internet 126 via radio waves, such as via Wi-Fi, Bluetooth® and/or a cellular telephone-based data communications protocol. PDA 119 may also communicate with exchange computer system 100 via a conventional wireless hub 128.

FIG. 2 also shows the LAN 124 coupled with a wide area network ("WAN") 126 which may be comprised of one or more public or private wired or wireless networks. In one embodiment, the WAN 126 includes the Internet. The LAN 124 may include a router to connect LAN 124 to the Internet. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 3 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. The exchange computer system 100 may exchange information with other miners or nodes in a blockchain network. One skilled in the art will appreciate that numerous additional computers and systems may be coupled to exchange computer system 100. Such computers and systems may include clearing, regulatory and fee systems.

The operations of computer devices and systems shown in FIG. 2 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Numerous additional servers, computers, handheld devices, personal digital assistants, telephones and other devices may also be connected to exchange computer system 100. Moreover, one skilled in the art will appreciate that the topology shown in FIG. 2 is merely an example and that the components shown in FIG. 2 may include other components not shown and be connected by numerous alternative topologies.

Figure 3:
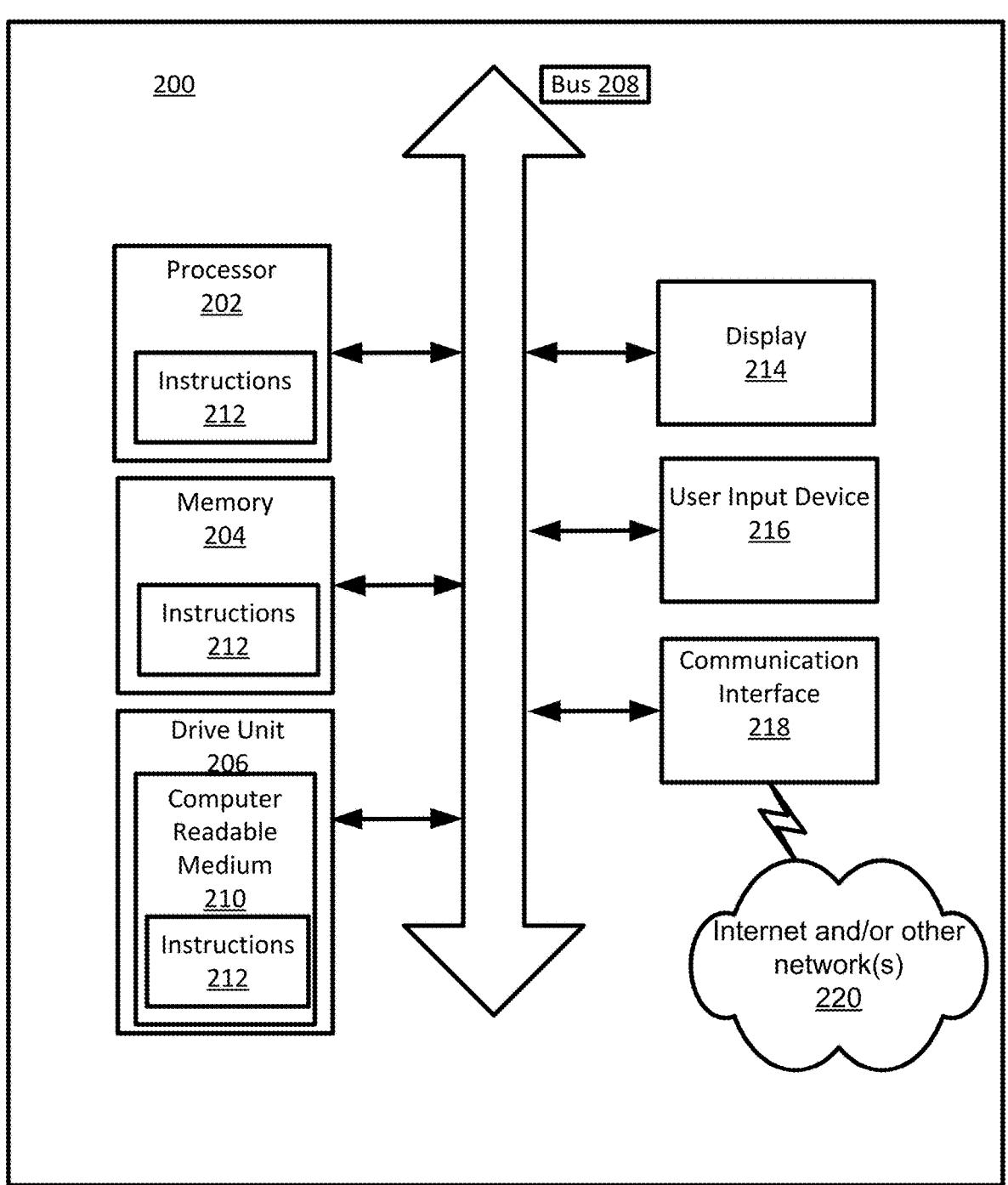
FIG. 3 shows an illustrative embodiment of a general computer system for use with the system of FIGS. 2 and 4.

Referring to FIG. 3, an illustrative embodiment of a general computer system 200 is shown. The computer system 200 may include a set of instructions that may be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 may be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 3, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that may communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital versatile disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 3, the computer system 200 may also include a disk or optical drive unit 206. The disk drive unit 206 may include a computer-readable medium 210 in which one or more sets of instructions 212, e.g., software, may be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 may communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single-medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, may be constructed to implement one or more of the methods described herein. For example, the blockchain module 142 may include application specific integrated circuits configured to generate the proof of work. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and one or more processors of any kind of digital computer. Generally, a processor will receive instructions and data from a read only memory or a random-access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM discs. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well. Feedback provided to the user may be any form of sensory feedback, e.g., visual feedback, auditory feedback, or tactile feedback. Input from the user may be received in any form, including acoustic, speech, or tactile input.

Embodiments of the subject matter described in this specification may be implemented in a computing system that includes a back end component, e.g., a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

A system may depend on certain rules, logic, and inter-related objects and data. In technical and computing environments, a system may calculate values for multiple objects subject to rules, e.g., business or environment logic, associated with the objects. The system may identify the rules for calculating or validating business or transactional logic by parsing one or more blocks in a blockchain.

Figure 4:
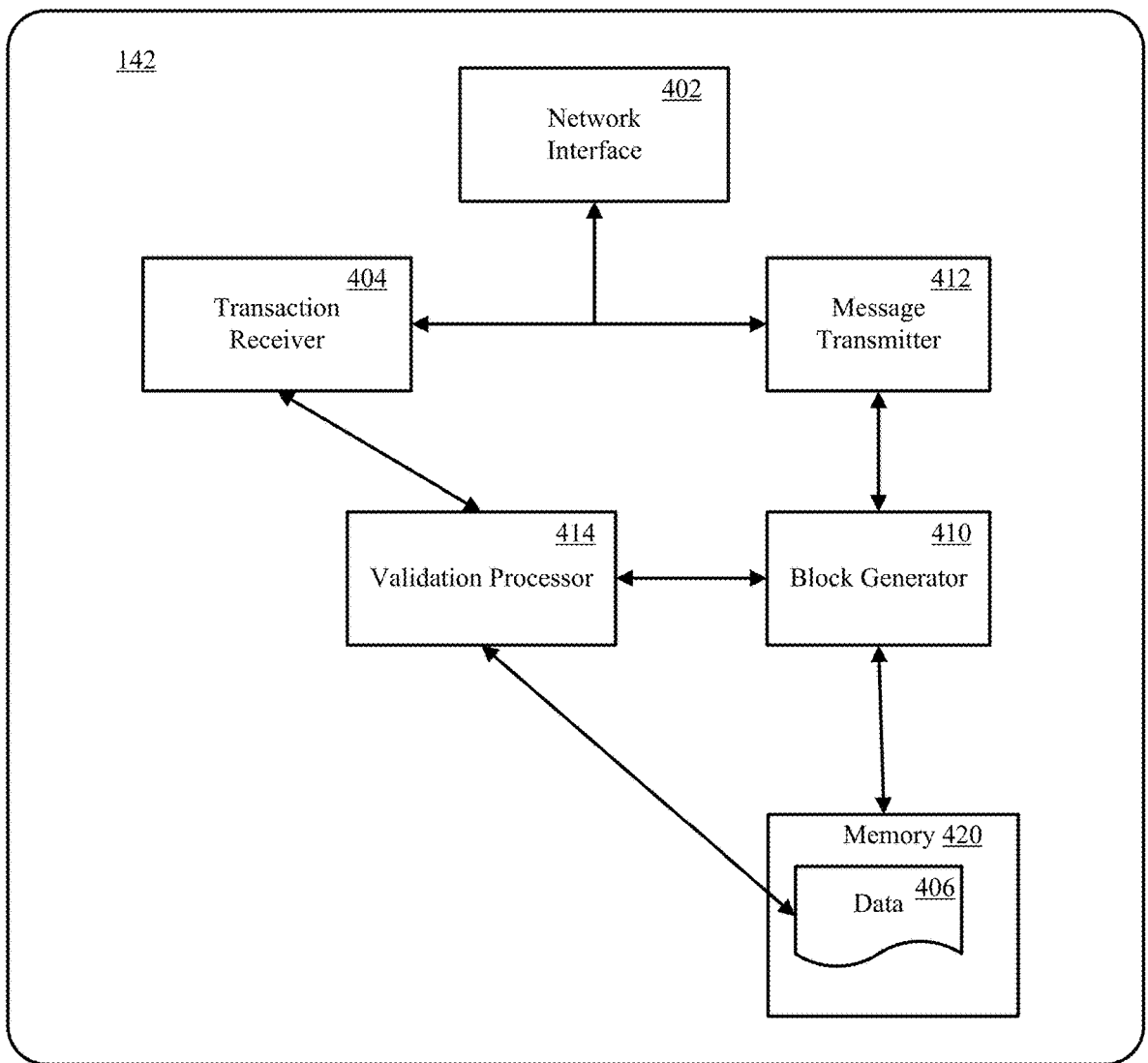
FIG. 4 depicts an illustrative embodiment of a blockchain module of the system of FIG. 2.

FIG. 4 depicts a more detailed block diagram of the blockchain module 142 of the exchange computer system 100 of FIG. 2. The blockchain module 142 may be representative of a blockchain client, e.g. a miner or node and may be configured to run blockchain software that facilitates the validation, generation, and communication of one or more transactions and/or one or more blocks in a blockchain network. The blockchain module 142 includes a network interface 402, transaction receiver 404, a message transmitter 412, a block generator 410, and a validation processor 414. The network interface 402, which may comprise the network interface is operative to couple the blockchain module 142 with a network, such as a public and/or private communications wired and/or wireless network, and facilitates communications among the miners or nodes in the blockchain network as described herein. The blockchain module 142 may store the data structure 406 of the blockchain in a memory 420. Static and dynamic validation rules derived from data in the blockchain may be stored in the memory 420 in the data structure 406 or in a datastore in the validation processor 414.

The blockchain module 142 includes a transaction receiver 404, coupled with a network interface 402. The transaction receiver 404 is operative to receive a data transaction message from a first participant of the plurality of participants. The transaction receiver 404 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 3 and described in more detail above with respect thereto, or other non-transitory computer readable medium, and executable by a processor, such as the processor 204 shown in FIG. 3 and described in more detail above with respect thereto, to cause the processor to, or otherwise be operative to receive a data transaction message, described below, from a participant (blockchain client) in the blockchain network. The data transaction message includes data indicative of a request to modify data stored in the shared data structure (blockchain).

The blockchain module 142 includes a message transmitter 412, coupled to the block generator 410, operative to transmit a new data block to the plurality of participants of the blockchain system. The message transmitter 410, which may be implemented as a separate component or as one or more logic components, such as on an FPGA which may include a memory or reconfigurable component to store logic and processing component to execute the stored logic, e.g. computer program logic, stored in a memory, such as the memory 204 shown in FIG. 3 and described in more detail below with respect thereto, or other non-transitory computer readable medium, and executable by a processor, such as the processor 202 shown in FIG. 3 and described in more detail below with respect thereto, to cause the processor to, or otherwise be operative to, generate a data message including data indicative of a transaction or block.

The blockchain module 142 includes a validation processor 414 that is operative to determine based on the set of validation rules if the received data transaction message is valid. The validation processor 414, which may be implemented as a separate component or as one or more logic components, such as on an FPGA which may include a memory or reconfigurable component to store logic and processing component to execute the stored logic, or as second logic, e.g. computer program logic, stored in a memory, or other non-transitory computer readable medium, and executable by a processor, to cause the processor to, or otherwise be operative to, identify one or more rules in a block, a transaction message, or store in the data structure 406 of the blockchain. The validation processor 414 may be operative to verify the signature of the transaction. The validation processor 414 may include a verification algorithm that is used to check if a blockchain client sending the message has been signed by the sender.

The blockchain module 142 includes a block generator 410, which may be implemented as a separate component or as one or more logic components, such as on an FPGA which may include a memory or reconfigurable component to store logic and processing component to execute the stored logic, e.g. computer program logic, stored in a memory, or other non-transitory computer readable medium, and executable by a processor, such as the processor 202 shown in FIG. 3 and described in more detail below with respect thereto, to cause the processor to, or otherwise be operative to, generate a block including the validated transaction message. The block generator 410 may be operative to generate a proof of work. The result of the proof of work may be included in the generated block. The block generator 410 may be operative to digitally sign the generated block. A key may be provided by the exchange computer system 100 or stored in memory or the blockchain module 142.

Figure 5:
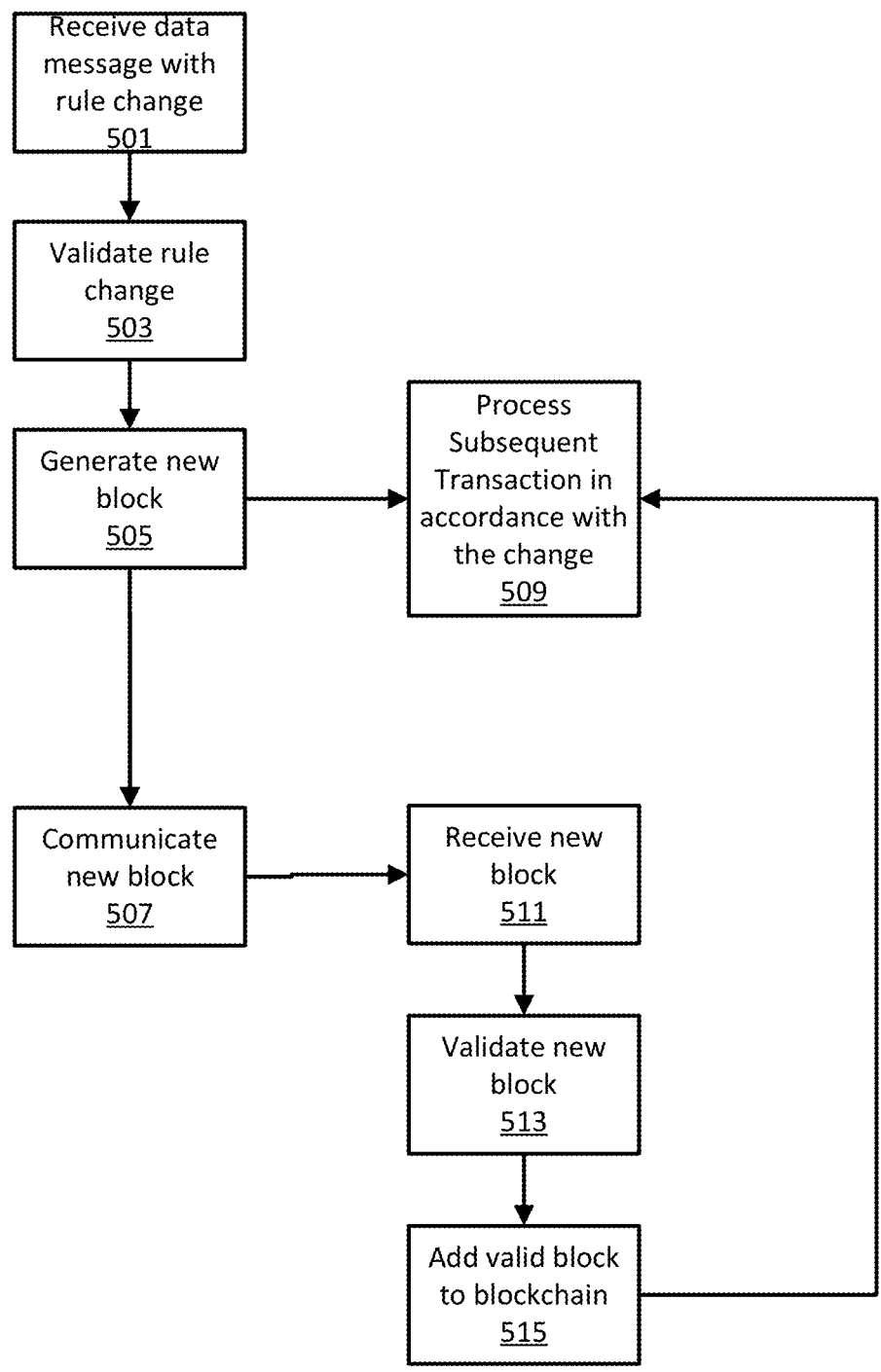
FIG. 5 depicts an example workflow for synchronizing changes to rules in a blockchain system.

FIG. 5 illustrates an example workflow for synchronizing changes to rules in a blockchain system as may be implemented with computer devices and computer networks, such as those described with respect to FIGS. 2, 3, and 4. The method may be implemented by a representative blockchain client such as the blockchain module 142 of FIG. 4. The method may be implemented by one or more blockchain clients that are participants in a blockchain network. The one or more blockchain clients may include one or more nodes, one or more miners, and or one or more mining nodes. Embodiments may involve all, more or fewer actions indicated by the blocks of FIG. 5. The actions may be performed in the order or sequence shown or in a different sequence At act 501 a data message is received that includes a proposed rule change. Proposed rule changes may be received in a transaction message or using a separate formatted message. For a transaction message, the proposed rule change may be indicated in one or more data fields in the transaction message. Generally, a request data transaction message may include data indicative of a request to store new data in the data structure management system. In the Bitcoin protocol, transaction messages are cryptographically signed records that propose reassigning ownership of Bitcoins to new addresses. Transactions in the Bitcoin protocol include metadata, input records that reference the funds from other previous transactions, and output records that describe the criteria needed to spend the transferred Bitcoins.

A transaction message may include metadata that describes the transaction message, e.g. the size of the transaction, a number of transaction inputs, and a number of transaction outputs. A hash of the transaction, later stored in a block, may serve as a unique ID for the transaction. This allows the system to use hash pointers to reference transactions. The transaction may further include a "lock_time" field. If the lock_time field contains any value other than zero for the lock time, the funds may not be spent until the specified lock time. The transaction will be invalid before either a specific block number, or a specific point in time, based on the timestamps that are put into blocks. The lock_time field may be used to prepare a rule change for a specific time.

The transaction inputs form an array of inputs. Each input has the same form. An input specifies a previous transaction, e.g. it contains a hash of the previous transaction that acts as a hash pointer to the previous transaction. The input also contains the index of the previous transaction's outputs that is being claimed. The inputs may include a signature script that verifies the transaction. Each transaction input may be signed to show that the owner has the ability to claim the previous transaction outputs. For the Bitcoin protocol, each input may include a script that generally includes a cryptographic digital signature that unlocks the funds from the prior transaction. Only the entity possessing the appropriate private key is able to create a satisfactory signature. The digital signature provides authorization that the funds may be spent. In one implementation, multiple signatures may be required (e.g. two of two signatures required, two of three signatures, three of five signatures, etc.). One or more of the parties of the multiple signatures may require alternative conditions in order to provide an authorization. In an example, an address may require that two of three parties provide authorization. A first party directs the transfer, a second party, e.g. a wallet provider, may provide authorization if the transaction meets certain conditions (e.g. size, authorized payees, etc.), and a third party, e.g. recovery service, may only provide authorization when the first or second party has been compromised. In this way, the first party may direct the transaction, but cannot complete the transaction without authorization provided from either the second or third party.

The transaction outputs may also be an array of outputs. Each output may have two or more fields. The fields each have a value, and the sum of all the output values has to be less than or equal to the sum of all the input values. If the sum of the output values is less than the sum of the input values, the difference is a transaction fee to the miner that solves the proof of work equation and publishes the transaction to a node. The transaction output further includes a script containing conditions for claiming the output (e.g. identifying an address(es), or wallet(s) for the output).

Additional fields or information may be included in the transaction message. For example, each transaction may include a description field that allows for the transaction message generator to describe the transaction. Other fields that allow for identification of the transaction type may be included. Additionally, as described below, fields or data may be included in the transaction message to indicate a rule change.

The transaction message may include syntax for expressing dynamic validation rules in a non-ambiguous, computer-readable format. The syntax may define or otherwise specify how additions, changes, or deletions of one or more of the validation rules, incorporated into the client's blockchain software, are accomplished. The validation rules may be included with the blockchain software and may accept changes that are parsed or read from the blockchain or transaction messages. For example, the blockchain software may store a set of validation rules that may be altered when a properly signed message containing a rule change is received or identified in the block.

The syntax for specifying these validation rules may take any number of forms, e.g. XML or JSON. In one embodiment, the syntax may not be extendible to cover rules of different forms thereby presuming that the party creating the syntax may list all possible scenarios where a validation rule change may be needed. Should a need arise which was not foreseen when the syntax was defined, then the syntax may be extended. In an embodiment, all miner and node operators may need to update their software before the extended syntax may be utilized. Alternatively, the syntax may be defined to be extensible, such as, for example, where some or all of the syntax itself is a form of Turing complete language, or a bytecode designed to execute on a virtual machine. This would enable a party to add additional validation rules not foreseen when the party first created the blockchain. The blockchain software may store the validation rules in memory. The blockchain software may include logic that parses or interprets data from the blockchain and derives rules or values for the rules from data in the blockchain.

In an embodiment, a validation rule change is included in a transaction message. The format of a transaction may be altered to include a field that includes data indicative of the rule change. For example, the format described above for a transaction message may be supplemented to include a "rule identifier" field and a "rule change" field that indicate which rule is to be altered. The rule identifier may correspond to a rule identifier field in the blockchain software. The transaction message may further include timing fields that indicate the timing of the rule change e.g. immediately, or it will be valid at a given point in the future, e.g. specified via a specific date and time, as a time delay until validity, or a particular future block number, or other occurrence of an event or combination thereof. The timing field may use the lock_time field described above, or may be different than the lock_time field. The lock_time field, for transactions transferring funds, designates the soonest time—when the funds in the transaction may be spent. The distinctive timing fields here may designate the soonest time for when a rule change may take effect. For example, the rule change may be included in a block, but not take effect until a later time. The time may be absolute, e.g. the change takes effect in block 223, or relative to the block that includes the rule, e.g. the change takes effect 100 blocks after this block. These rule change messages may also include data indicating an expiration at which time the rules changes are no longer valid, either absolute or relative, and as a date and time or block number. The rule change may be set to take effect or expire when a condition is met in the blockchain. If no expiration is specified, the rule change may be considered valid until revoked or otherwise modified by a subsequent suitable rule change.

A transaction that contains a rule validation change, as with other transactions, may be authorized by a responsible party or parties, e.g. an exchange computer system or administrator. A signature shows that the party has the permissions to alter the validation rules and that the validation rule changes should be accepted and included in the Block. In a multiple signature scenario, a rule validation change may require authorization from two or more parties.

For transactions that do not include a validation rule change, the fields may be left empty. In the event that a transaction field does include a validation rule change, a flag may be set in the block to indicate that the block includes a rule change. By flagging the blocks that include validation rule changes, a new miner may quickly parse the blockchain to determine the current set of rules. Alternatively, the miner or node may parse or search the blockchain for a transaction performed by a specific party that has authority to alter the validation rules.

In an embodiment, the validation rule syntax has a separate format than a transaction format. A transaction message as described above includes fields for both input and output (that describe the transaction between the parties). A validation rule may only require a single party and may not have similar formatting to a transaction message. For example, a rule change transaction message may only contain an input field that includes the rule change syntax and a signature of the party making the rule change.

The Bitcoin protocol groups the transactions in the block into the TX array. The block structure is described below. In an embodiment, the validation rule syntax is stored as a separate field in the block. For example, a RX array may be used to store one or more rule validation changes. The blockchain, in addition to accepting transaction messages, would also accept rule change messages, which may be in the form of a request for a change or a directive to change, according to the disclosed syntax. Rule change messages may be similar to transactions, i.e. the rule change messages may be transmitted to one or more blockchain clients, validated by the blockchain clients, and once validated trigger a mining process to add the rules changes to the blockchain as described below, wherein once successfully added to the blockchain, are propagated to other nodes via communication of the successful block creation. In an embodiment, the validation rule changes may be stored in distinct blocks from a normal block that contains transactions. For example, the blockchain may include two different types of blocks, transaction blocks and rule validation change blocks.

In an embodiment, a rules version identifier may be included in the transaction message. A rules version identifier may be a simple counter that increments every time a rule is adjusted or changes. The rules version identifier may be used to quickly determine that a rule set for a node is up to date (and that each rule change has been implemented in the blockchain). For example, a transaction message may include a rules version identifier that states that the "version" of rules if for example 2345. In a counter example, a node that receives the transaction message should be at rule version 2344 prior to receiving the transaction message. If a node receives a block with a new rule, the version is incremented. In this way, the node keeps a running total of the number of changes that may easily be ascertained. A fork in the protocol may also be identified by the version number of the rules.

The rule changes may include any changes made to the validation rules for transactions (or rule change) message. The validation rules may include one or more of the following:

A whitelist of wallet addresses that may hold and/or transact in the digital asset.

A blacklist of wallet addresses that are prohibited from holding and/or transacting in the digital asset.

A certificate revocation list of invalid certificates.

A list of wallet addresses authorized to sign certificates that authorize users to use the blockchain.

Technical parameters about the blockchain, such as the maximum block size and parameters governing the average frequency at which blocks are mined.

Transaction fee schedules, including minimum, maximum, and percent fees, the ability to assign different fee schedules to different senders and receivers (e.g. when sending airline miles to an airline to purchase a ticket, the transaction fee may not apply, but when giving the miles to a relative as a gift, it would apply.)

Demurrage fees.

Inactivity fees.

How fees are to be assessed, e.g. destruction of the digital asset, payment to the miner, payment to a specified address.

Miner and node rewards, if any.

The identity of parties allowed to issue assets, and the parameters (e.g. 2 out of the following 3 keys must sign) for authorizing the request.

The identity of parties allowed to confiscate assets (e.g. to enforce a court order), and the parameters (e.g. 2 out of the following 3 keys must sign) for authorizing the request.

The maximum number of decimal places of precision for transactions.

The minimum and maximum sizes for transactions.

The maximum account balance.

Cumulative limits for transactions.

The identity of parties allowed to change rules, the types of rules the parties are allowed to change, and the parameters (e.g. 2 out of the following 3 keys must sign) for authorizing the request. For example, if user 1, user 2, and user 3 may each have permissions to change the rules. Each of the users 1, 2, or 3 may generate a transaction message that includes syntax to alter a validation rule. However, one of the validation rules (used to validate the rule change transaction messages) may require two of the three users to sign or transmit a message that changes the permission of the responsible parties. User 1, for example, may not be allowed to unilaterally revoke the rule change permissions of User 3. However, if two of the three users, 1, 2, and 3 transmit messages that revoke the permissions of User 3, then the rule change may be accepted. In another example, each party may be allowed to change only certain rules. User 1 may be allowed to change rules 1, 2, and 3, while User 2 may be allowed to change rules 3, 4, and 5. User 3 may be allowed to change rules 1-5. The permissions may be altered over time as new administrators of the blockchain or authorities are introduced or retire.

The above listed rules are exemplary and that the rules implemented by the blockchain software and/or otherwise allowed to be added, removed or modified as described herein, are implementation dependent and that other rules may be developed, now or at a later time, in addition to and/or in lieu of the above described rules, to which the disclosed embodiments would be applicable.

In one embodiment, the blockchain may implement a set of static rules which may not be modified, except by an update to the blockchain software, as well as a set of dynamic rules, which may be modified as described herein. For example, the validation rule syntax may only be applied to specific rules. The syntax may be unable to alter the maximum number of decimal places by using a rule change message but are able to alter the whitelist of wallet address. In this example, the maximum number of decimal places may be changed by a software update. The separation of the dynamic and static rules may be included in the blockchain software as initially installed. Any changes to the separation of the dynamic and static rules may only be accomplished by downloading a new version of software. In this way, the miners or nodes may be assured that certain aspects of the software may be unchangeable without their input, while agreeing that certain validation rules may be changed by responsible parties. Alternatively, the entirety of the rules by which the blockchain software operates may be dynamic and modifiable.

Referring back to FIG. 5, at act 503, the proposed rule changed is validated. The proposed rule change is validated according to the one or more rules stored in the blockchain software or the blockchain data. The one or more rules may be identified from previous blocks and stored in the blockchain software. Any rule changes identified from new blocks or transaction messages may be used to update the one or more rules. If the data message is determined to be valid, at act 505, a new block is generated comprising at least the data indicative of the change to the operation of the system to the blockchain.

At act 507, the generated new block is communicated to other blockchain clients in the blockchain system. As described above in FIG. 1, blockchain technology is based on a ledger that uses a series of blocks to build a chain of transactions. The new block generated with data from the transaction message may become part of the chain of blocks if validated by other blockchain clients. At act 511, the new block is received by other blockchain clients and after the new block is validated at act 513, the new block is added to the blockchain (act 515). Subsequent transactions and blocks are thereto subjected (act 509) to the one or more rules stored in the blockchain including the added rule change.

Figure 6:
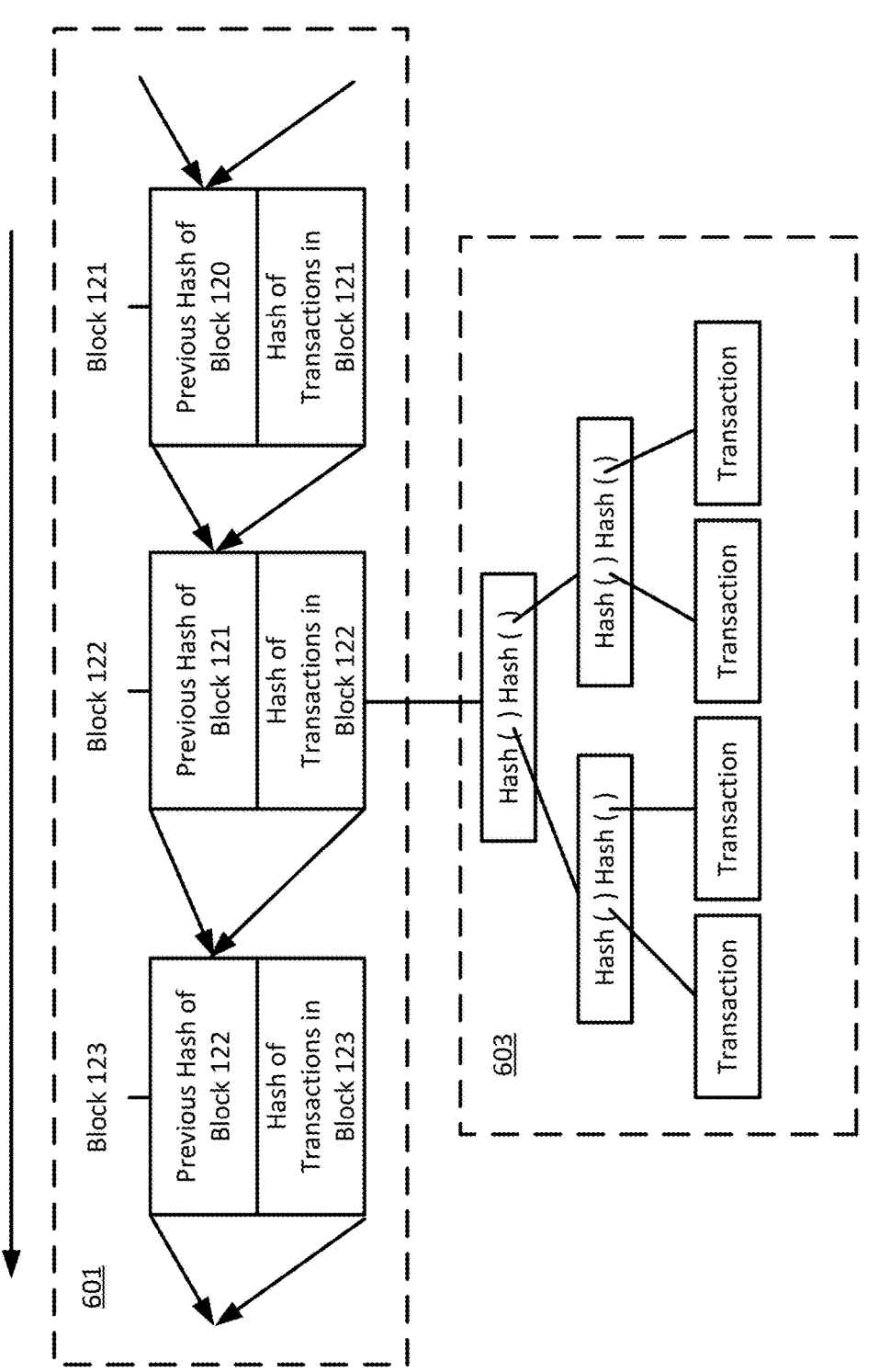
FIG. 6 depicts an illustrative embodiment of a blockchain system.

FIG. 6 illustrates an example blockchain 601 comprising a hash chain of blocks. Each block is connected or "chained" to the previous block by a hash chain. For example, Block 122 contains a reference to the hash of the previous block's header (parent block) in the chain (Block 121). The hash of block 122 is included in block 123 and so on. In this way, the blockchain is linked to the previous block creating a chain. For a given block, all subsequent blocks after that block verify the given block. The given block verifies all the blocks prior to the given block. This allows for a distributed ledger with a high fault tolerance. FIG. 6 also illustrates the Merkle root tree 603. Each block contains a Merkle hash tree of the transactions included with the block. The Merkle root is a hash of the root of the Merkle tree of the block's transactions. A binary tree with hash pointers is known as a Merkle tree. Each transaction is a leaf of the tree. The transactions or leaves are grouped into pairs of two. For each pair, a data structure is built that has two hash pointers, one to each of these leaves. The data structures make the next level up of the tree. The data structures are then grouped into groups of two, and for each pair, a new data structure that contains the hash of each. This process is continued up until there is a single block, e.g. the root of the tree. The root is then hashed and stored in this field.

FIG. 7 illustrates an example block of the blockchain of FIG. 6. The block 701 shares a similar format to a block used in Bitcoin. Alternative formats may be used. For example, the fields that apply to the proof of work in Bitcoin may be different for blockchains that do not use proof of work. Additional fields may be included that include rule changes or indications of rule changes to the validation rules. Certain fields may be excluded. For example, RX count and Rule array fields may not be used if the rules are stored in the transaction array. The block 701 includes a version field 703, a prev_block field 705, a merkle_root field 707, a timestamp 709, a difficulty field 711, a nonce field 713, a TX (transaction) count field 715, a RX (rules) count field 717, a TX array 719, and a RX array 721.

The version field 703 contains a number that is used to track the software/protocol upgrades for Bitcoin. The Bitcoin software is constantly updated to fix bugs and warnings. Protocol changes such as network protocols are also adjusted as systems change. Major changes to the validation rules may also be updated through software upgrades. For the Bitcoin protocol, the appropriately updated software would be released that, when used for mining, indicates its willingness to support the proposed change by adding information in blocks it mines. For example, during a period of time subsequent to being implemented, the modified software broadcasts messages to other blockchain clients, e.g. as part of communication information about blocks, indicating that it is ready to implement the new rule and accept blocks from other blockchain clients created subject to the new rule. The software would then watch the blockchain, or otherwise wait to receive similar messages from the other nodes, and once it sees a certain threshold, e.g. 95%, of all blocks mined in a time period, e.g. 2 weeks, or, alternatively messages from 51% or more of all nodes, contain information that the party mining the messages supports the change, it would begin using the updated rule after a certain time period, e.g. 2 weeks, in the future. This gives miners comprising, in this example, less than 5% of the computing power who do not run software supporting the change a chance to upgrade their software so as to prevent a fork once the change is implemented. The version field 703 provides for new miners and existing miners to easily check to see if their protocol version is up to date. If not, the blockchain clients, e.g. miners and nodes, may download updated software in order to participate in the Bitcoin protocol.

In an embodiment, a version field 703 or modified version field may be used to indicate the state of the validation rules. For example, the version field 703 may track both the blockchain software version and the validation rules. For each validation rule change that is implemented the validation rule version may be altered (e.g. incremented). A validation rule version value allows each node to determine if the validation rule set is up to date and further to quickly verify that a received block or transaction was generated with the most up to date rules.

The previous block hash field 705 includes a reference to the hash of the previous block's header in the chain. Hashing is the transformation of a string of characters into a hash (e.g. shorter fixed-length value or key) that represents the original string. The hash is substantially smaller than the text itself and is generated by a formula in such a way that it is extremely unlikely that some other text will produce the same hash. The previous block hash field 705 may contain a hash of the previous block's header.

As described above, the Merkle root 707 is a hash of the root of the Merkle tree of the block's transactions. A binary tree with hash pointers is known as a Merkle tree. Each transaction is a leaf of the tree. The transactions or leaves are grouped into pairs of two. For each pair, a data structure is built that has two hash pointers, one to each of these leaves. The data structures make the next level up of the tree. The data structures are then grouped into groups of two, and for each pair, a new data structure that contains the hash of each. This process is continued up until there is a single block, e.g. the root of the tree. The root is then hashed and stored in this field.

The timestamp 709 is the approximate creation time of the block. The timestamp may be used to determine when a validation rule takes effect. For example, a transaction message containing a validation rule may also contain a future time when the validation rule is to be implemented.

A block in the Bitcoin protocol also has two fields that are directly related to the proof of work algorithm. The difficulty target 711 is the proof-of-work algorithm difficulty target for the block. The Nonce 713 is a counter used for the proof of work algorithm. The Bitcoin protocol uses proof of work to avoid issues of network abuse. Proof of work is a mechanism used to prevent constructing alternative blockchains that may lead to double spending. Proof of work requires an amount of computational work from a participant to arrive at a solution and submit a block. By using proof of work, the Bitcoin protocol can make it prohibitively expensive to generate an alternative block chain from which double spending could occur. Proof of work or alternatives such as proof of stake or proof of burn may be used in an embodiment. Each of these proofs are attempts to prevent a double spending situation and allow for consensus of the blockchain.

The block has a TX count field 715 and a TX array 719. The TX count field 715 stores the number of transactions in the block 701, while the TX array 719 includes the transaction data. In an embodiment, a validation rule change may be stored in the TX array and may count as a transaction.

The block has a RX count field and a RX array. The RX count field is the number of rule changes in the block, which the RX array includes the rule changes. If there are no rule changes in the block, these fields may be left empty. In an embodiment, the RX array 721 may include syntax or instructions to add, modify, or delete specific rules. In an alternative embodiment, the rule array 721 may store a full copy of the rules or a copy of all the rules changes made up to the point the block was generated.

A block may contain additional data such as the size, height, block index, and the node that generated or relayed the block. Examples of values for the fields in a block are listed below:

"ver":1,
"hash":"0000000000000bae09a7aded75aa67e46cb8393a8ac1f7acaa5ad94f9eacd103"
"prev_block":"0000000000000dca880a6c124e2509577d0f98d9e
12df8952e0439ac7409738a"
"mrkl_root":"935aa0e1e0c995c39e06995ecce7ddbebd2e29a4b8b26ed32d550a72e8200bf5"
"time":1222131230
"nonce":2961215930,
"n_tx":19,
"n_rx":2,
"block_index":618024,
"relayed_by":"112.61.108.165",
"tx":[--Array of Transactions--],
"rx":[--Array of Rule Changes--].

Figure 8:
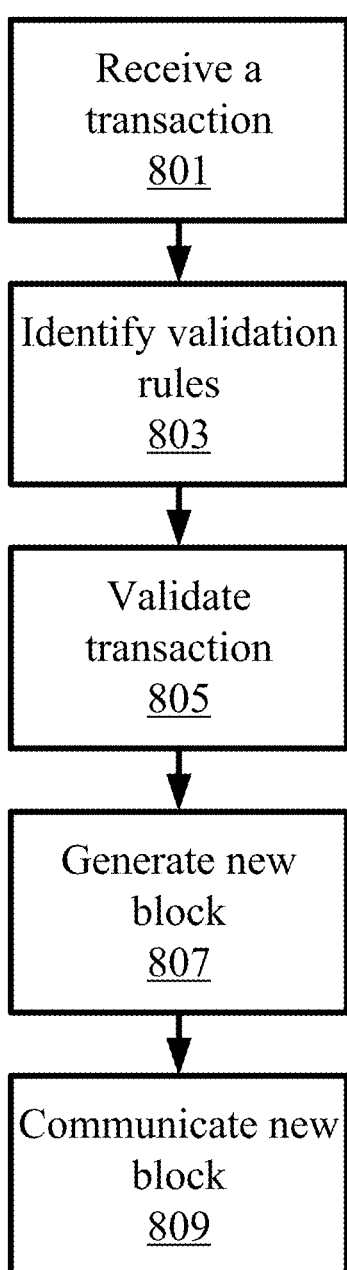
FIG. 8 depicts an example workflow for validating a transaction in a blockchain system.

FIG. 8 illustrates a method for validating a transaction in a system that implements a blockchain as may be implemented with computer devices and computer networks, such as those described with respect to FIGS. 2, 3, and 4. The method may be implemented by one or more blockchain clients that are participants in a blockchain network. The one or more blockchain clients may include one or more nodes, one or more miners, and or one or more mining nodes. Embodiments may involve all, more or fewer actions indicated by the blocks of FIG. 8. The actions may be performed in the order or sequence shown or in a different sequence At act 801, a blockchain client receives a data message comprising a transaction to be implemented by the blockchain. The transaction message may be received from a participant in the blockchain network. The transaction message may be formatted as described above and may include metadata, inputs, and outputs.

At act 803, the blockchain client identifies in data stored in a plurality of blocks of the blockchain, one or more rules for validation of the transaction. Dynamic rules may be stored in a repository maintained by the blockchain software, which may be cryptographically protected. In an embodiment, dynamic rules and subsequent changes thereto, e.g. new dynamic rules or modifications to existing rules, may be processed similar to transactions and blocks, and themselves be stored in a blockchain data structure, which may be the same or a different blockchain in which transactions are stored. Furthermore, rule change messages may be cryptographically validated in order to be accepted by the blockchain software. When a blockchain client accepts a rule change and incorporates it into a mined block, that block is then propagated to other entities for validation and acceptance. A block mined by another blockchain client that contains a validated rule change is accepted and stored in the receiving entities' blockchain, thereby incorporating the rule change therein.

Blockchain software, e.g. miner and node software, may, in addition to following static validation rules encoded in the software itself, also examine the blockchain and/or validate transactions and perform mining, etc. according to these dynamic rules. In particular, the blockchain software may continually evaluate the validity specification of each dynamic rule and, based thereon, would determine the set of rules valid at the time in question, e.g. the current time, or the block number that is being mined or validated. It would then enforce the rules valid at the time in question, either in selecting transactions and mining a block, or determining if another block is valid.

When a blockchain client is setup or installed, the blockchain software may parse the blockchain to identify the dynamic rules and values for the dynamic rules. For example, at startup, the blockchain software may have a blank set of validation rules. The blockchain software may start at the beginning of the blockchain (genesis block or block 0) and identify any rule changes. The blockchain software proceeds by parsing each block from the beginning to the most recent block to generate a set of current rules for validation. More recent rules may override rules that were implemented at an earlier date. For example, a removal of a user from a whitelist at Block 200 may override the addition of the user to the whitelist at Block 150. In an embodiment, the blockchain software may identify an initial set of validation rules from the genesis block or block 0. The genesis block or subsequent block may include values for each of the rules set forth in the genesis block.

The validation rules may include one or more of the following:

A whitelist of wallet addresses that may hold and/or transact in the digital asset.

A blacklist of wallet addresses that are prohibited from holding and/or transacting in the digital asset.

A certificate revocation list of invalid certificates.

A list of wallet addresses authorized to sign certificates that authorize users to use the blockchain.

Technical parameters about the blockchain, such as the maximum block size and parameters governing the average frequency at which blocks are mined.

Transaction fee schedules, including minimum, maximum, and percent fees, the ability to assign different fee schedules to different senders and receivers (e.g. when sending airline miles to an airline to purchase a ticket, the transaction fee may not apply, but when giving the miles to a relative as a gift, it would apply.)

Demurrage fees.

Inactivity fees.

How fees are to be assessed, e.g. destruction of the digital asset, payment to the miner, payment to a specified address.

Miner and node rewards, if any.

The identity of parties allowed to issue assets, and the parameters (e.g. 2 out of the following 3 keys must sign) for authorizing the request.

The identity of parties allowed to confiscate assets (e.g. to enforce a court order), and the parameters (e.g. 2 out of the following 3 keys must sign) for authorizing the request.

The maximum number of decimal places of precision for transactions.

The minimum and maximum sizes for transactions.

The maximum account balance.

Cumulative limits for transactions.

The identity of parties allowed to change rules, the types of rules the parties are allowed to change, and the parameters (e.g. 2 out of the following 3 keys must sign) for authorizing the request.

At act 805, the blockchain client determines if the transaction is valid according to the one or more validation rules. Different validation rules may include a timing mechanism for when the validation rules are to be implemented. For example, a change to a validation rule may be stored in a block on the blockchain. However, if the time for the implementation of the validation rule has not been reached, the blockchain client will use the older rule to validate the transaction. For example, a fee change may be set to take place on the $1^{st}$ of the month. While this rule may be identified at act 803, if the $1^{st}$ of the month has not been reached yet, the blockchain client will still use the old fee.

At act 807, the blockchain client generates a new block including the transaction. Blockchain clients validate the transaction and add the transaction to a new block. Once the block has been finished and a proof of work accomplished, the blockchain client, at act 809, communicates data indicative of the new block to the network of entities implementing the blockchain.

When a block is added to the blockchain and validated by the blockchain clients in the network, the block becomes a permanent part of the blockchain. The next block will contain a hash of the added block's header that links the two blocks together and makes up the chain. However, for the first block in the chain, there is no previous block. A genesis block or block 0 may be used to start or seed a blockchain.

Figure 9:
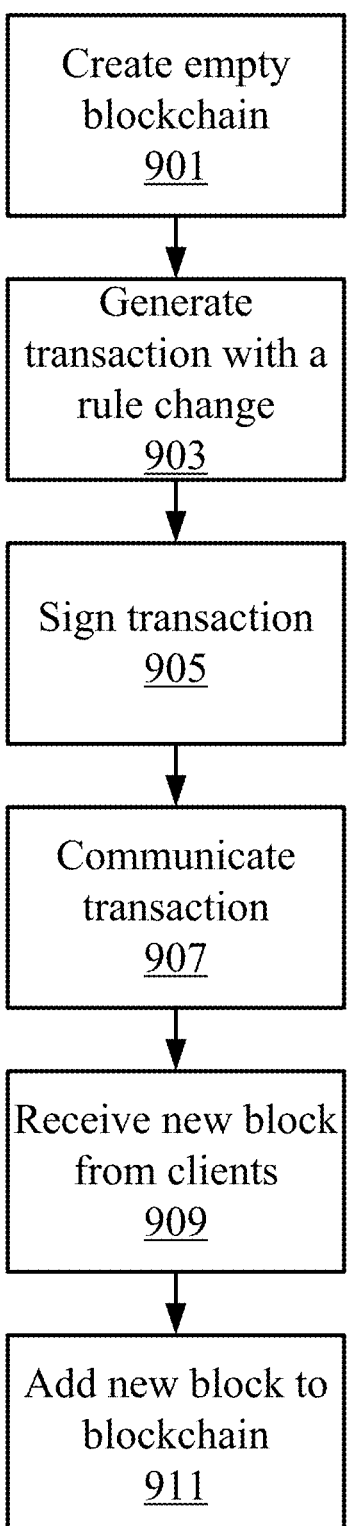
FIG. 9 depicts an example workflow for building a set of rules for a blockchain system.

FIG. 9 depicts an example method of building a set of rules for a blockchain system by adding dynamic rules to an initial block as may be implemented with computer devices and computer networks, such as those described with respect to FIGS. 2, 3, and 4. The method may be implemented by one or more blockchain clients that are participants in a blockchain network. The one or more blockchain clients may include one or more nodes, one or more miners, and or one or more mining nodes. Embodiments may involve all, more or fewer actions indicated by the blocks of FIG. 9. The actions may be performed in the order or sequence shown or in a different sequence. The dynamic rules may then be changed after the blockchain is generated.

At act 901, the blockchain is generated by a party or parties. The blockchain may be generated, for example, using a genesis block. The genesis block (or block 0) may be coded into blockchain software that is distributed to the blockchain clients that participant in the blockchain network.

In an embodiment, the genesis block may include one or more dynamic rules or values for the dynamic rules. Alternatively, these rules may be included in, for example, block 1. In such an embodiment, the genesis block may be coded into the source blockchain software. The source software may also include one or more dynamic rules. The first block after the genesis block may include values for the one or more dynamic rules. The party or parties creating the blockchain, e.g. those who will have central authority over the rules for digital assets issued on the blockchain, may anticipate every type of rule change the parties may wish to enforce at present or in the future, and verify that this syntax for rule additions, changes, and deletions may support all such rules. In an example, the initially distributed blockchain software may contain a dynamic whitelist. The whitelist may be blank for the initially distributed blockchain software but may be built up using data values from either the genesis block or the first subsequent block. In this way, the entirety of the values for each of the dynamic rules are included in the blockchain. The validation rules of the blockchain may be identified without the original source code for the blockchain software.

In one embodiment, the blockchain software is designed, developed, and tested to support all dynamic rule changes allowed by the syntax. The party or parties creating the blockchain, e.g. who will have central authority over the rules for digital assets issued on the blockchain, may ensure that the blockchain contained records authorizing the party or parties to change the dynamic rules, as well as the dynamic rules themselves. An example of a dynamic rule is changing a whitelist or blacklist without requiring a software installation or lookup. After generation, the blockchain may operate according to the initial rules set forth in the source code and genesis block.

At some point in time, the parties may wish to change one or more values for the dynamic rules. At act 903 a transaction is generated comprising a rule change to how future transactions are to be validated. Continuing the airline frequent flyer example used above, an airline may determine that User A is acting illegally and should have his frequent flyer mile wallet frozen, effective immediately. The airline generates and sends to a blockchain client to be published, a signed transaction including a rule change to the blockchain revoking User A's wallet certificate. The transaction may include syntax that deletes User A from a whitelist or adds User A to a blacklist.

At act 905, one or more parties provides authorization for the transaction with a digital signature authorized to make rule changes. Each transaction input must be signed to show that the owner has the ability to claim the previous transaction outputs. At act 907, the party communicates the transaction to a blockchain client which further communicates the transaction to other blockchain clients, e.g. nodes, or systems implementing the blockchain. At act 909, the blockchain clients in the blockchain network validate that the rule change is legitimate (e.g. the airline's key was previously listed as a key authorized to make these types of rule changes) and will pass it to all other blockchain clients. A blockchain client, e.g. miner, includes this rule change, along with any other transactions, in Block 123, and succeeds in mining it, which is announced via the blockchain clients to the entire network. The block is received by the blockchain client which verifies that the new block follows the rule change.

At act 911, the blockchain client adds the new block to the blockchain. The new block includes the rule change. If User A, who previously was permitted to transfer airline miles, requested a transfer of airline miles that a miner added to Block 122, it will be deemed valid. If User A requested a transfer of airline miles that a miner wished to include in Block 123 or later, the request should be deemed invalid. The miner had an obligation, when mining Block 123, to discard any User A transactions as this would be incompatible with the rule change that Block 123 includes. All blockchain clients in the network, upon seeing Block 123 that the miner produces, will validate that Block 123 does not violate the new rule it imposes, as it does not contain any transactions by User A. All miners attempting to create Block 124 that links back to Block 123 will refuse to include any transactions by User A. No blockchain software should willingly ignore the rule, but even if this does happen and a miner ends up mining Block 124 with a transaction by User A linking back to Block 123 containing the rule change, it will be immediately obvious to all other miners that this Block 124 objectively fails validation against the set of rules valid as of Block 124.

In an embodiment, a party may wish to give advance notice to the users of a rule change. Using the example above, the airline wants to add a 1% transaction fee, effective in 1 day, when no transaction fees previously existed. The airline publishes a signed transaction to the blockchain instituting this transaction fee and indicates block number 223 as the effective time for the rule change because the airline believes it will be mined approximately 24 hours in the future. Blockchain clients, e.g. nodes, validate the transactions, and a blockchain client, e.g. a miner, adds this transaction to Block 123. Customer wallet software observing the blockchain will see this rule change and, following the successful mining of Block 222, will begin issuing all transactions with a 1% fee. Any miner who creates Block 222 will allow transactions without a fee, but any miner who creates Block 223 must ensure that every transaction carries a 1% fee, otherwise it must be rejected.

A blockchain with rules defined exclusively in software would require all miners and nodes to upgrade their software in advance of 24 hours, or a fork could result should a miner produce a block with a block number >=223 without the 1% fee. It also follows that, in a public blockchain comprised of travelers who own airline miles, the imposition of a 1% transaction fee would be unwelcome, and such miners would be reluctant to install the software update. Still, it would be difficult to consider operators of miners and nodes that fail to install the new software as bad actors; the blockchain clients may have valid reasons such as vacations, lost notice about the need to update the software, etc. which nonetheless could contribute to significant blockchain forks.

A private blockchain controlled by the airline may achieve such a software update, but as stated above, private blockchains have drawbacks. If the time window for the rule change needed to be reduced, and advance warning were not available, it is easy to see even a private blockchain failing to install the change in time across all entities in the network, resulting in forks.

This rule change using dynamic rules as described herein to enforce 1% transaction fees may be made without any necessary software update by the blockchain clients because the blockchain software is capable of parsing the syntax of the rule change in Block 123 and enforcing the new rule without any need for operator actions like a software upgrade on the part of the blockchain clients. Explicit cooperation by the blockchain clients is entirely unnecessary to implement this rule change. The operators of the entities may not be inclined to take additional action to cooperate. Further, a miner or node may continue to mine or act as a node even if the user is unaware of the change.

It is still possible for the blockchain operators who disagree with the rule change to produce and install their own custom version of the software that ignores the rule change. This would cause a fork should the miners succeed in mining a block containing transactions without fees. However, if only a small minority of miners and nodes took such an action, the impact to the rest of the network would be minimal. Further, in this case, it is clear that the operator of the node or miner took an action contrary to the defined rules and as such could be considered a bad actor.

In blockchain systems, miners often have flexibility in determining which transactions are included in a block. Due to race conditions, miners may be working to mine a block and succeed right as a new transaction is sent to the miner for inclusion; miners in this case often will publish the block anyway, and this new transaction will remain part of the pool of transactions not included in a mined block but available to be added. In Bitcoin, this pool is called the mempool. After publication of the block, miners will often see this new transaction in the mempool and attempt to include it in the next block, so, as long as it is valid, it should eventually be included in a mined block.

Figure 10:
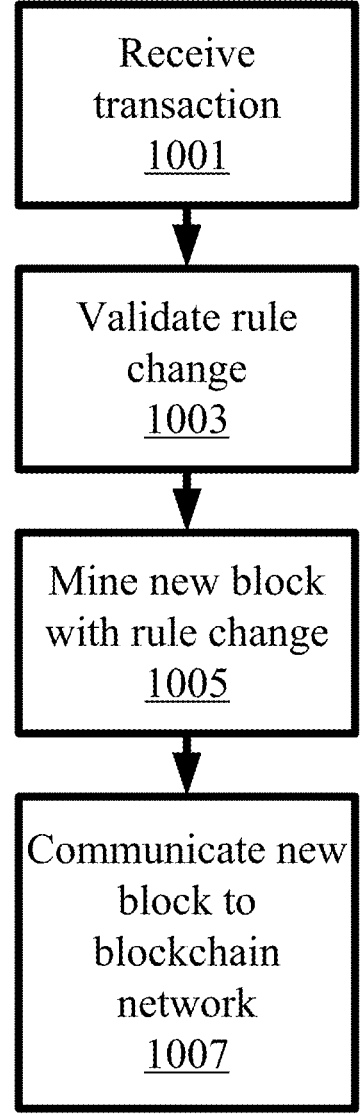
FIG. 10 depicts an example workflow for validating transactions in a blockchain system.

FIG. 10 illustrates an example method for validating transactions in a system that implements a blockchain as may be implemented with computer devices and computer networks, such as those described with respect to FIGS. 2, 3, and 4. The method may be implemented by one or more blockchain clients that are participants in a blockchain network. The one or more blockchain clients may include one or more nodes, one or more miners, and or one or more mining nodes. Embodiments may involve all, more or fewer actions indicated by the blocks of FIG. 10. The actions may be performed in the order or sequence shown or in a different sequence.

At act 1001, a blockchain client receives data indicative of a signed transaction message including a rule change to the blockchain. The signed transaction message may include syntax for expressing dynamic validation rules in a non-ambiguous, computer-readable format. The syntax may define or otherwise specify how additions, changes, or deletions of one or more of the validation rules, incorporated into the node's blockchain software, are accomplished. The validation rules may be included with the blockchain software and may accept changes that are parsed or read from the blockchain or transaction messages. For example, the blockchain software may store a set of validation rules that may be altered when a properly signed message containing a rule change is received or identified in the block.

At act 1003, the blockchain client validates that the rule change is legitimate. The blockchain client identifies and classifies the data indicative of a rule change. The blockchain client then verifies if the rule changes are valid according to the existing rules stored in the blockchain (or stored at the client). The blockchain client may, for example, check to make sure one or more signers of the transaction message (and rule change) are authorized to make the rule change. The blockchain client, may, for example, check to make sure the rule change is compatible for the existing rules. One or more validation rules may be static, e.g. not dynamic and as such are not allowed to change. The blockchain client may check for compatibility or format. For example, a rule for transaction fees may require a four-digit decimal. If the proposed rule change is a six-digit number or if the value is out of an assigned range, the proposed rule change may be invalidated.

At act 1005, a blockchain client generates a new block with the signed transaction. The block may be generated including the data in the block described in FIG. 7. The blockchain client may group one or more transactions (including the signed transaction with the rule change), generate a Merkle hash of the group of transactions, and provide a proof of work.

If, while during generation, a valid rule change appears in the mempool, the blockchain software may detect this and cause the miner to abandon any attempt at mining a new block which does not include this rule change. The blockchain software instead will divert its computing power immediately towards attempting to mine a new block which does include the rule change or an additional rule change. The blockchain software may also re-evaluate any current transactions in the new block to make sure the transactions comply with the rule change.

At act 1007, the blockchain client communicates the new block to other blockchain clients implementing the blockchain. If the blockchain client is the first to provide the proof of work with the new block, the blockchain client may be compensated for the work. The new block is verified by the other entities in the blockchain network. Once verified, the new block is added to the blockchain by the blockchain client and the other entities implementing the blockchain. The blockchain client makes the change to the rule specified in the new block resulting in an updated set of rules. The blockchain client may receive data indicative of a second signed transaction. The second signed transaction may be a standard transaction including inputs and outputs. The second signed transaction may be signed by a participant of the blockchain network. The blockchain client checks the second signed transaction using the updated set of rules. If the second signed transaction is valid, the blockchain client includes the second signed transaction in a second new block. If the second signed transaction is invalid, the blockchain client discards the second signed transaction. After receiving a number of valid transactions, the blockchain client attempts to mine another block.

Figure 11:
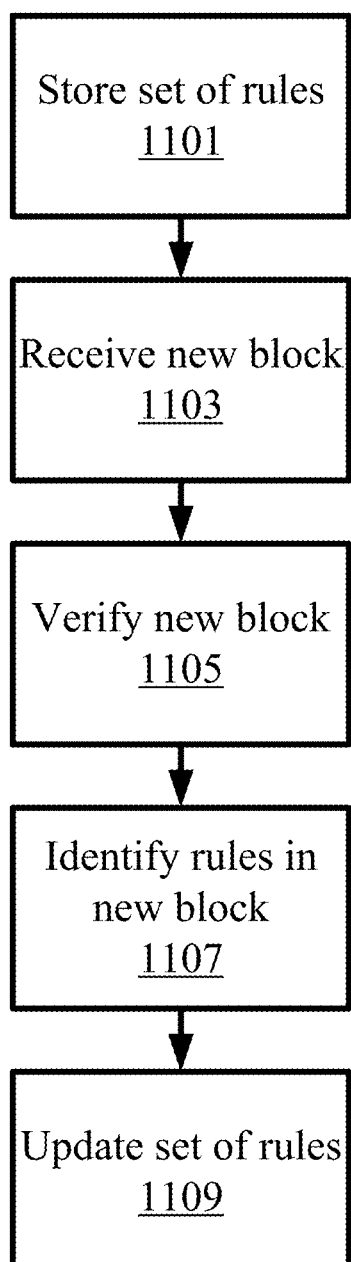
FIG. 11 depicts an example workflow for updating rules in a blockchain system.

FIG. 11 illustrates a method for updating rule changes in a system that implements a blockchain for transactions as may be implemented with computer devices and computer networks, such as those described with respect to FIGS. 2, 3, and 4. The method may be implemented by one or more blockchain clients that are participants in a blockchain network. The one or more blockchain clients may include one or more nodes, one or more miners, and/or one or more mining nodes. Embodiments may involve all, more or fewer actions indicated by the blocks of FIG. 11. The actions may be performed in the order or sequence shown or in a different sequence.

At act 1101, the blockchain client stores data indicative of a set of rules for validation of a transaction implemented in a blockchain. The syntax for specifying these validation rules may take any number of forms, e.g. XML or JSON. In one embodiment, the syntax may not be extendible to cover rules of different forms thereby presuming that the party creating the syntax may list all possible scenarios where a rule change may be needed. Should a need arise which was not foreseen when the syntax was defined, then the syntax could be extended. However, doing so likely would require that nearly all miner and node operators update their software before the extended syntax could be utilized. Alternatively, the syntax may be defined to be extensible, such as, for example, where some or all of the syntax itself is a form of Turing complete language, or a bytecode designed to execute on a virtual machine. This would enable the airline, in this example, to add additional validation rules not foreseen when the airline first created the digital asset.

At act 1103, the blockchain client receives a data message including a new block. Transaction messages may be sent to one or more participants in the blockchain. The one or more participants receive the transactions, verify the transactions, and package the transactions into an array. In the Bitcoin protocol, the blockchain clients may also generate a proof of work. The array of transactions and proof of work is packaged into a new block which is subsequently communicated to each of the other participants in the network.

At act 1105, the blockchain client verifies the new block is valid based on one or more rules. The one or more rules may include rules for a whitelist, a blacklist, a revocation list, technical parameters, permissions, transaction fee schedules, the identity of parties allowed to change rules, the types of rules the parties are allowed to change, and the parameters (e.g. 2 out of the following 3 keys must sign) for authorizing the request among others. The above listed rules are exemplary and that the rules implemented by the blockchain software and/or otherwise allowed to be added, removed or modified as described herein, are implementation dependent and that other rules may be developed, now or at later time, in addition to and/or in lieu of the above described rules, to which the disclosed embodiments would be applicable.

At act 1107, the blockchain client identifies one or more rule changes in the new block. The new block may include syntax for expressing dynamic validation rules in a non-ambiguous, computer-readable format. The syntax may define or otherwise specify how additions, changes, or deletions of one or more of the validation rules, incorporated into the node's blockchain software, are accomplished. The validation rules may be included with the blockchain software and may accept changes that are parsed or read from the blockchain or transaction messages. For example, the blockchain software may store a set of validation rules that may be altered when a properly signed message containing a rule change is received or identified in the block.

At act 1109, the blockchain client updates the one or more rules stored in memory using the one or more rule changes. The validity of transactions received subsequent to the new block are subject to the one or more rules stored in the blockchain including the one or more rule changes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these may not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this may not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above may not be understood as requiring such separation in all embodiments, and it may be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it may be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
receiving, by a processor of a system executing computer program code which maintains a copy of a blockchain data structure and validates transactions and addition of blocks of transactions thereto, a data message comprising data indicative of a change to operation of the system with respect to how the system validates transactions and/or processes blocks of validated transactions for addition to the blockchain data structure wherein the computer program code comprises a static rule data store, operative to store one or more static rules, and the blockchain data structure comprises one or more blocks comprising one or more dynamic rules,
wherein the static rules stored in the static rule data store may only be modified by modifying the computer program code;
determining, by the processor, that the data message is valid according to the one or more static rules stored in the static rule data store and the aggregate of the one or more dynamic rules stored in the blocks of the blockchain data structure, and based thereon, modifying the one or more dynamic rules stored in the blockchain data structure by generating a transaction in a new block comprising at least the data indicative of the change to the operation of the system to the blockchain; and
communicating, by the processor, data indicative of the new block to other systems maintaining copies of the blockchain data structure; and
wherein validity of transactions received by the system subsequent to the new block is subject to the aggregate of the one or more static rules and the current one or more dynamic rules stored in the blocks of the blockchain data structure, including the added change to the operation of the system.

2. The computer implemented method of claim 1, wherein the data message further specifies when the change in operation of the system is to be effective, wherein the validity of transactions received subsequent to the added block is subject to the one or more rules stored in the blockchain data structure including the added change to the operation of the system when those transactions are received by the system subsequent to when the change in operation of the system is to be effective.

3. The computer implemented method of claim 2, wherein when the change in operation of the system is to be effective is specified by a block number.

4. The computer implemented method of claim 1, wherein the data message is digitally signed by two or more parties authorized to change the operation of the system.

5. The computer implemented method of claim 1, wherein the change to the operation of the system comprises an additional rule to the one or more rules stored in the blockchain data structure which adds to previously stored rules, overrides one or more previously stored rules, or a combination thereof.

6. The computer implemented method of claim 1, wherein a newer rule in a more recently generated block takes precedence over an older rule in an older block.

7. The computer implemented method of claim 1, wherein the one or more rules comprise at least:
a transaction fee schedule; or
a whitelist of wallet addresses.

8. The computer implemented method of claim 1, wherein the generating of the transaction in the new block further comprises:
signing, by the processor, the transaction with a signature authorized to make rule changes for the blockchain data structure; and
communicating, by the processor, the transaction to the other systems.

9. The computer implemented method of claim 8, wherein the blockchain data structure includes a list of signatures authorized to make rule changes.

10. The computer implemented method of claim 1, wherein the data message is a first signed transaction including a first rule change to the blockchain, the method further comprising:
receiving, by the processor, data indicative of a second signed transaction;

validating, by the processor, the second signed transaction
using one or more rules stored in the blockchain data
structure including the first rule change;

if the second signed transaction is valid, including the
second signed transaction in a second new block; and discarding, by the processor, the second signed transaction if the second signed transaction is invalid.

11. The computer implemented method of claim 10, further comprising:

receiving, by the processor, data indicative of a third
signed transaction including a second rule change while
generating the new block;

validating, by the processor, the second rule change; and generating, by the processor, the new block including the
second valid rule change.

12. A system comprising:

a blockchain manager configured to maintain a copy of a
blockchain data structure and validate transactions and
addition of blocks of transactions thereto and including:

a transaction receiver, coupled with a network interface, operative to receive a data message comprising
data indicative of a change to operation of the system
with respect to how the system validates transactions
and/or processes blocks of validated transactions for
addition to the blockchain data structure wherein the
blockchain manager comprises a static rule data
store, operative to store one or more static rules, and
the blockchain data structure comprises one or more
blocks comprising one or more dynamic rules,
wherein the static rules stored in the static rule data
store may only be modified by modifying the blockchain manager;

a validation processor, coupled with the transaction
receiver, operative to determine that the data message is valid according to the one or more static rules
stored in the static rule data store and the aggregate
of the one or more dynamic rules stored in the blocks
of the blockchain data structure;

a data structure generator operative to, based on the
validation of the data message, modify the one or
more dynamic rules stored in the blockchain data
structure by generating a transaction in a new block
comprising at least the data indicative of the change
to the operation of the system to the blockchain; and a transmitter, coupled to the data structure generator,
operative to transmit data indicative of the new block
to other systems maintaining copies of the blockchain data structure; and wherein validity of transactions received by the system
subsequent to the new block is subject to the aggregate
of the one or more static rules and the current one or
more dynamic rules stored in the blocks of the blockchain data structure, including the added change to the
operation of the system.

13. The system of claim 12, wherein the data message
further specifies when the change in operation of the system
is to be effective, wherein the validity of transactions
received subsequent to the added block is subject to the one
or more rules stored in the blockchain data structure including the added change to the operation of the system when
those transactions are received by the system subsequent to
when the change in operation of the system is to be effective.

14. The system of claim 13, wherein when the change in
operation of the system is to be effective is specified by a
block number.

15. The system of claim 12, wherein the data message is
digitally signed by two or more parties authorized to change
the operation of the system.

16. The system of claim 12, wherein the change to the
operation of the system comprises an additional rule to the
one or more rules stored in the blockchain data structure
which adds to previously stored rules, overrides one or more
previously stored rules, or a combination thereof.

17. The system of claim 12, wherein a newer rule in a
more recently generated block takes precedence over an
older rule in an older block.

18. The system of claim 12, wherein the one or more rules
comprise at least:

a transaction fee schedule; or a whitelist of wallet addresses.

19. The system of claim 12, wherein the data structure
generator is further operative to:

sign the transaction with a signature authorized to make
rule changes for the blockchain data structure; and transmit the transaction to the other systems.

20. The system of claim 19, wherein the blockchain data
structure includes a list of signatures authorized to make rule
changes.

21. The system of claim 12, wherein the data message is
a first signed transaction including a first rule change to the
blockchain, further wherein:

the transaction receiver is further operative to receive data
indicative of a second signed transaction;

the validation processor is further operative to validate the
second signed transaction using one or more rules
stored in the blockchain data structure including the
first rule change; and the data structure generator is further operative to, if the
second signed transaction is valid, include the second
signed transaction in a second new block, and discard
the second signed transaction if the second signed
transaction is invalid.

22. The system of claim 21, wherein:

the transaction receiver is further operative to receive data
indicative of a third signed transaction including a
second rule change while generating the new block;

the validation processor is further operative to validate the
second rule change; and the data structure generator is further operative to generate the new block including the second valid rule
change.

23. A system comprising:

a processor and a memory coupled therewith, the memory
having stored therein computer executable code that
when executed by the processor, causes the processor
to maintain a copy of a blockchain data structure and
validate transactions and addition of blocks of transactions thereto and further cause the processor to:

receive a data message comprising data indicative of a
change to operation of the system with respect to
how the system validates transactions and/or processes blocks of validated transactions for addition to
the blockchain data structure wherein the blockchain
manager comprises a static rule data store, operative
to store one or more static rules, and the blockchain
data structure comprises one or more blocks comprising one or more dynamic rules, wherein the static
rules stored in the static rule data store may only be
modified by modifying the blockchain manager;

determine that the data message is valid according to
the one or more static rules stored in the static rule data store and the aggregate of the one or more dynamic rules stored in the blocks of the blockchain data structure;

modify the one or more dynamic rules stored in the blockchain data structure by generating a transaction in a new block comprising at least the data indicative of the change to the operation of the system to the blockchain; and transmit data indicative of the new block to other systems maintaining copies of the blockchain data structure; and wherein validity of transactions received by the system subsequent to the new block is subject to the aggregate of the one or more static rules and the current one or more dynamic rules stored in the blocks of the block-chain data structure, including the added change to the operation of the system.

\* \* \* \* \*